(12) United States Patent
Redden

(10) Patent No.: US 12,373,847 B1
(45) Date of Patent: Jul. 29, 2025

(54) SOCIAL EQUITY RENEWABLE ENERGY CREDIT DATASTRUCTURES AND DISTRIBUTED GENERATION ENGINE APPARATUSES, PROCESSES AND SYSTEMS

(71) Applicant: DCR Group LLC, Atlanta, GA (US)

(72) Inventor: Dana Clare Redden, Atlanta, GA (US)

(73) Assignee: DCR Group LLC, Atlanta, GA (US)

( * ) Notice: Subject to any disclaimer, the term of this patent is extended or adjusted under 35 U.S.C. 154(b) by 0 days.

(21) Appl. No.: 17/592,483

(22) Filed: Feb. 3, 2022

Related U.S. Application Data

(60) Provisional application No. 63/145,979, filed on Feb. 4, 2021.

(51) Int. Cl.
 *G06Q 30/018* (2023.01)

(52) U.S. Cl.
 CPC .................. *G06Q 30/018* (2013.01)

(58) Field of Classification Search
 CPC ........ G06Q 30/018; G06Q 50/06; Y02P 90/84
 See application file for complete search history.

(56) References Cited

U.S. PATENT DOCUMENTS

| | | | | |
|---|---|---|---|---|
| 2008/0091581 | A1* | 4/2008 | Kremen | G06Q 40/00 705/35 |
| 2010/0082499 | A1* | 4/2010 | Luff | G06Q 30/018 705/317 |

(Continued)

OTHER PUBLICATIONS

Kingsley, J. (2015). Closing California's Climate Gap: Understanding SB 535 Funding Allocations to Disadvantaged Communities. Occidental College, 1-92. (Year: 2015).*

(Continued)

*Primary Examiner* — John S. Wasaff
(74) *Attorney, Agent, or Firm* — Leason Ellis LLP

(57) ABSTRACT

The Social Equity Renewable Energy Credit Datastructures and Distributed Generation Engine Apparatuses, Processes and Systems ("SERECDG") transforms inputs via SERECDG components into community apportionment values outputs. In one embodiment, the SERECDG is an energy social equity allocation apparatus, comprising at least one memory, a component collection in the at least one memory, and at least one processor disposed in communication with the at least one memory and configured to issue a plurality of processor-executable instructions from the component collection. The SERECDG includes processor-executable instructions configured to obtain an energy equity participation request datastructure for the benefit of an underserved community, a climate steward site datastructure from an energy production site, and a climate steward request datastructure from an energy production site. The SERECDG also includes instructions to obtain a transfer of the energy credit donation value based the climate steward identifier and the energy credit donation value, determine community apportionment values for community identifiers based on collected energy credit donation values and energy equity participation request, and provide community apportionment values to requesting communities' energy credit account identifier accounts based on their community identifier.

29 Claims, 10 Drawing Sheets

(56) References Cited

U.S. PATENT DOCUMENTS

| | | | |
|---|---|---|---|
| 2010/0100405 A1* | 4/2010 | Lepore | G06Q 30/0601 |
| | | | 705/26.1 |
| 2010/0332373 A1* | 12/2010 | Crabtree | G06Q 40/04 |
| | | | 709/224 |
| 2012/0023037 A1* | 1/2012 | Allderdice | G06Q 40/10 |
| | | | 705/36 R |
| 2012/0095794 A1* | 4/2012 | Guthridge | G06Q 10/063 |
| | | | 705/7.11 |
| 2014/0188583 A1* | 7/2014 | Thatcher | G06Q 50/06 |
| | | | 705/14.11 |
| 2014/0222698 A1* | 8/2014 | Potdar | G06Q 30/018 |
| | | | 705/317 |
| 2015/0339762 A1* | 11/2015 | Deal | G06Q 30/0283 |
| | | | 705/27.1 |
| 2016/0203569 A1* | 7/2016 | Forbes, Jr. | G06Q 20/145 |
| | | | 705/34 |
| 2019/0372345 A1* | 12/2019 | Bain | H02J 3/381 |
| 2020/0372588 A1* | 11/2020 | Shi | G06Q 50/06 |
| 2021/0240151 A1* | 8/2021 | Yaffe | G05B 19/042 |
| 2022/0215489 A1* | 7/2022 | Theiss | G06Q 50/06 |
| 2023/0018298 A1* | 1/2023 | Caperton | G06F 16/2379 |

OTHER PUBLICATIONS

Chaurey, A., Ranganathan, M., & Mohanty, P. (2004). Electricity access for geographically disadvantaged rural communities—technology and policy insights. Energy policy, 32(15), 1693-1705. (Year: 2004).*

* cited by examiner

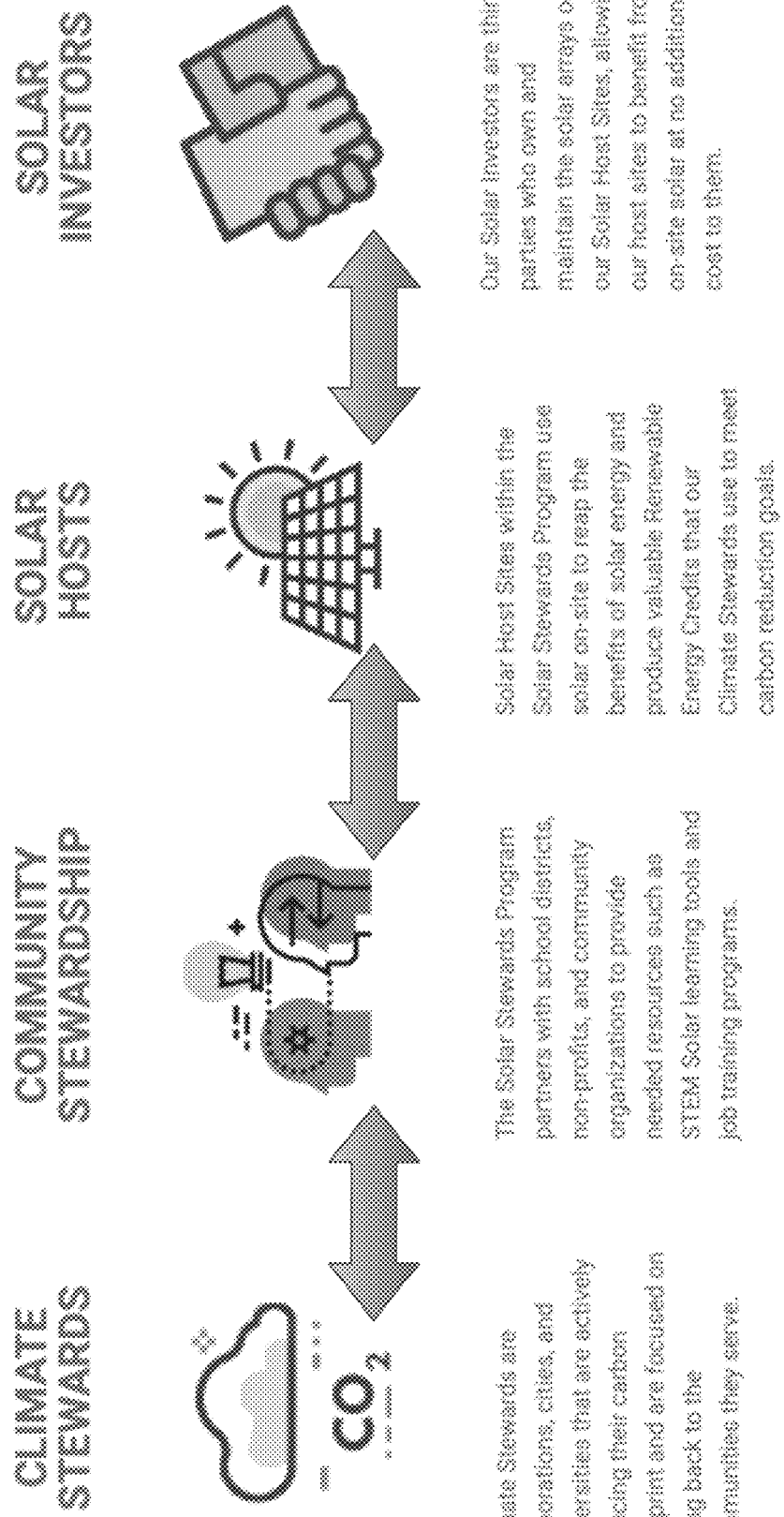
Fig. 1: SERECDG—datagraph

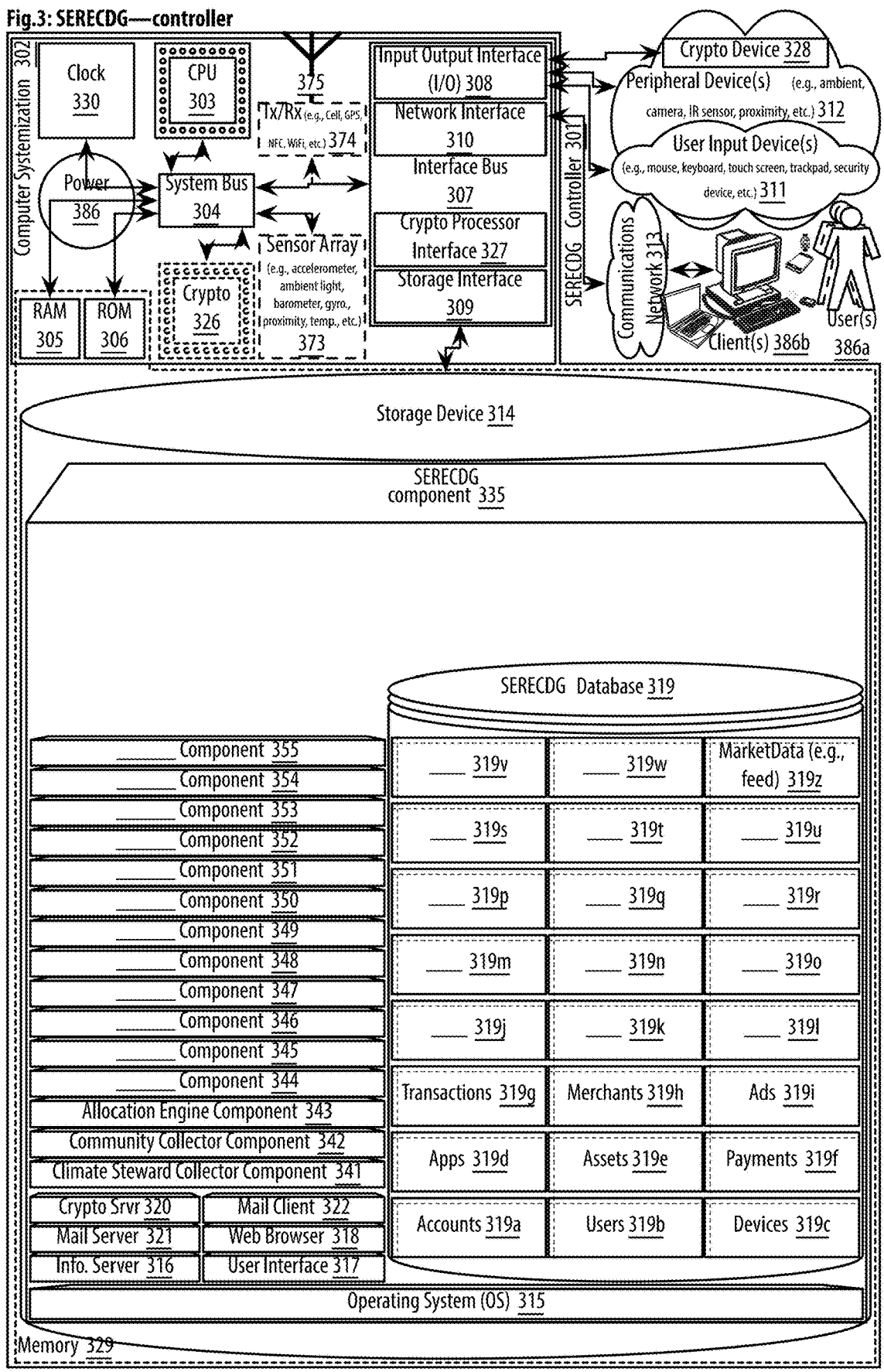
Fig.3: SERECDG—controller

US 12,373,847 B1

SOCIAL EQUITY RENEWABLE ENERGY CREDIT DATASTRUCTURES AND DISTRIBUTED GENERATION ENGINE APPARATUSES, PROCESSES AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

PRIORITY CLAIM

Applicant hereby claims benefit to priority under 35 USC § 119 as a non-provisional conversion, of: U.S. provisional patent application, Ser. No. 63/145,979, filed Feb. 4, 2021, entitled "Social Equity Renewable Energy Credit Datastructures and Distributed Generation Engine Apparatuses, Processes and Systems".

The entire contents of the aforementioned applications are herein expressly incorporated by reference.

FIELD

The present innovations generally address environmental clean energy, and more particularly, include Social Equity Renewable Energy Credit Datastructures and Distributed Generation Engine Apparatuses, Processes and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Environmental organizations, such as Green Peace, Earth System Governance Project, etc., stive to find ways to improve the environment. The US Environmental Protection Agency (EPA) has been established to protect the environment, and the EPA develops and enforces regulations regarding acceptable environmental conditions. The US department of Energy helps guide energy policy. Throughout history, various underprivileged groups of people have suffered social and economic disadvantages such as redlining for various goods and services (e.g., lack of broadband/telephony access).

BRIEF DESCRIPTION OF THE DRAWINGS

Appendices and/or drawings illustrating various, non-limiting, example, innovative aspects of the Social Equity Renewable Energy Credit Datastructures and Distributed Generation Engine Apparatuses, Processes and Systems (hereinafter "SERECDG") disclosure, include:

FIG. 1 shows a datagraph illustrating data flow(s) for the SERECDG;

FIG. 3 shows a block diagram illustrating embodiments of a SERECDG controller;

APPENDICES 1-9 illustrates embodiments of the SERECDG.

Figure 2A:
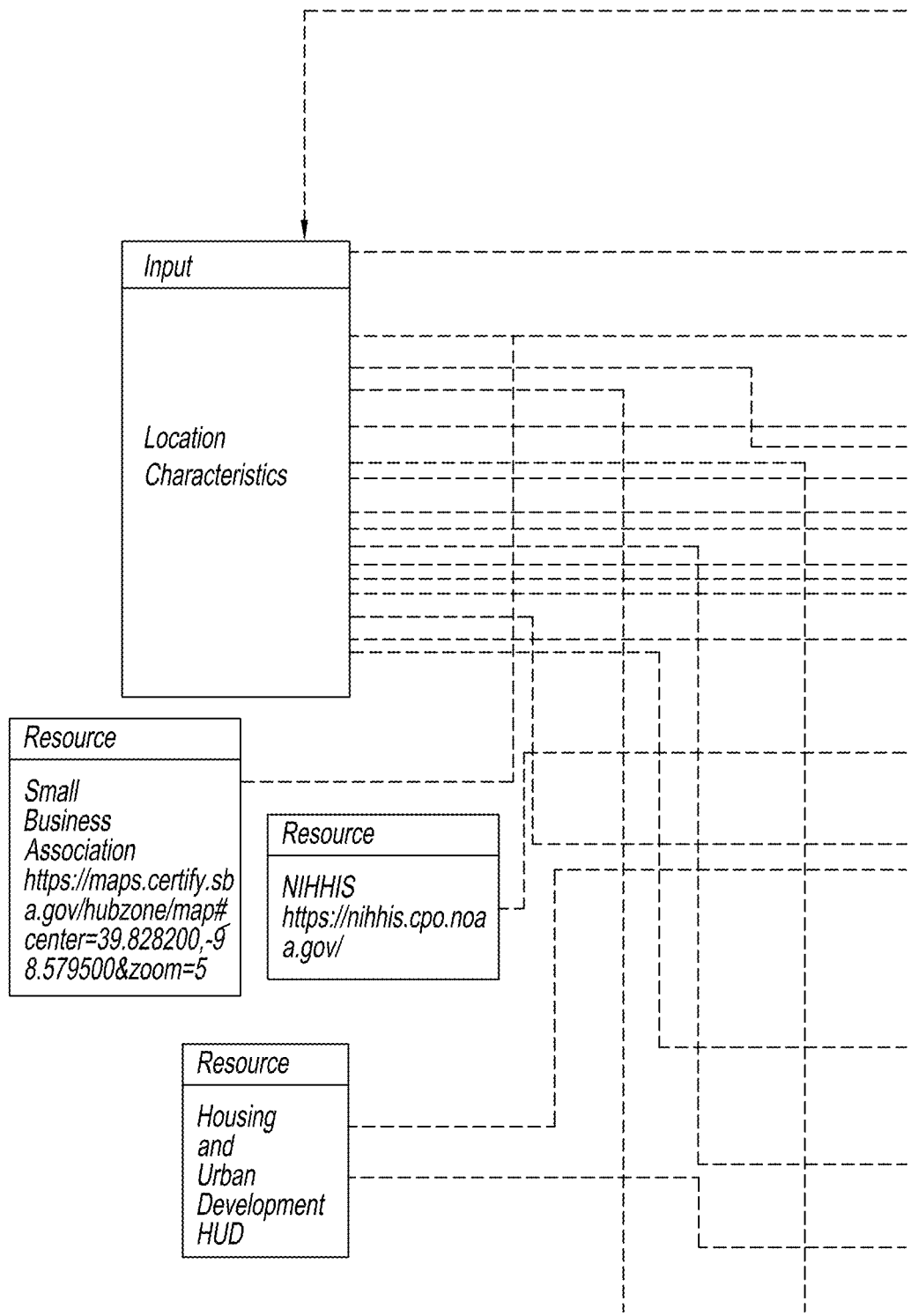
FIGS. 2A-2H (hereinafter as FIG. 2) show non-limiting, example embodiments of a datagraph illustrating data flow(s) for the SERECDG.
Figure 2B:
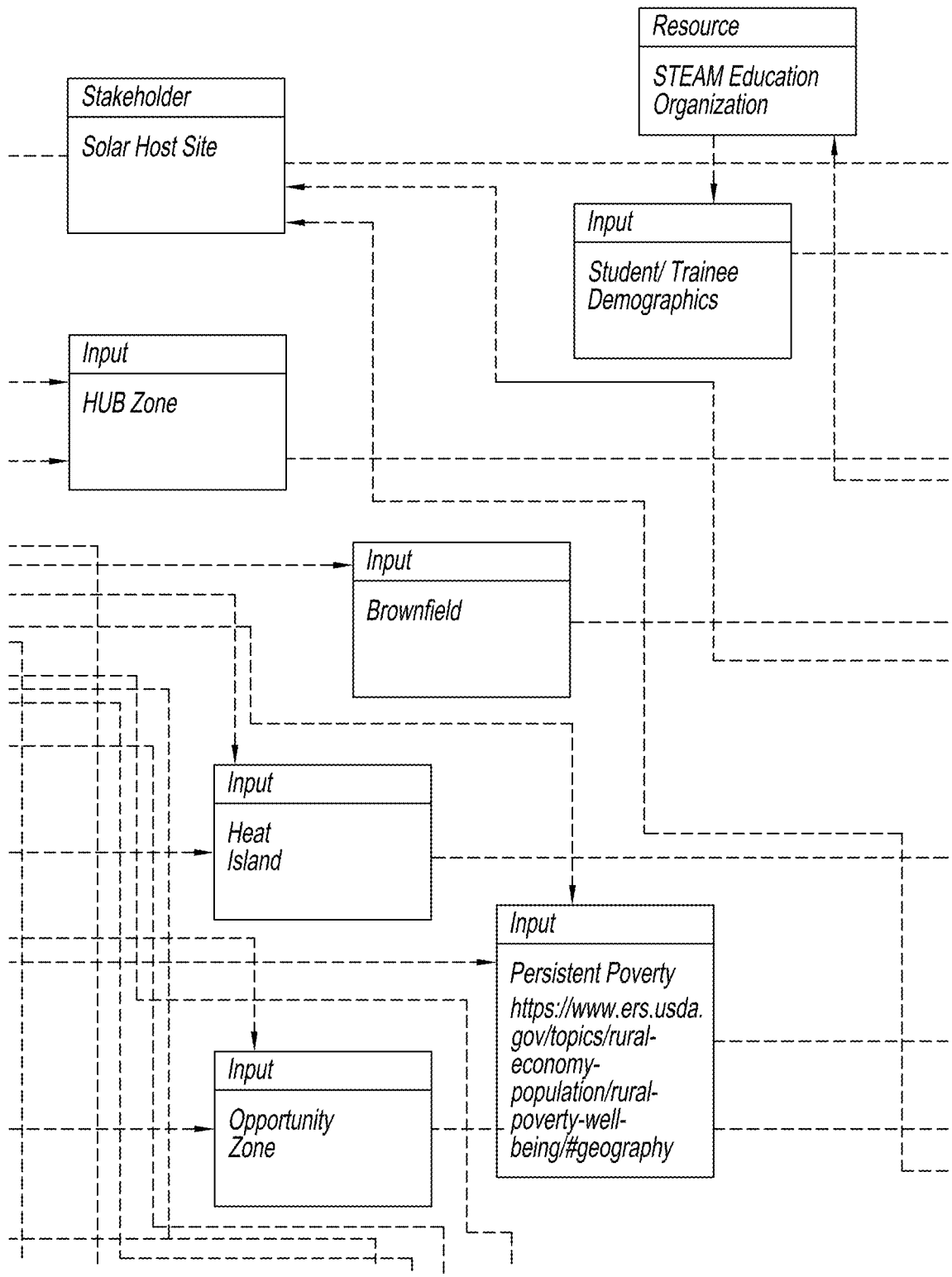
Figure 2C:
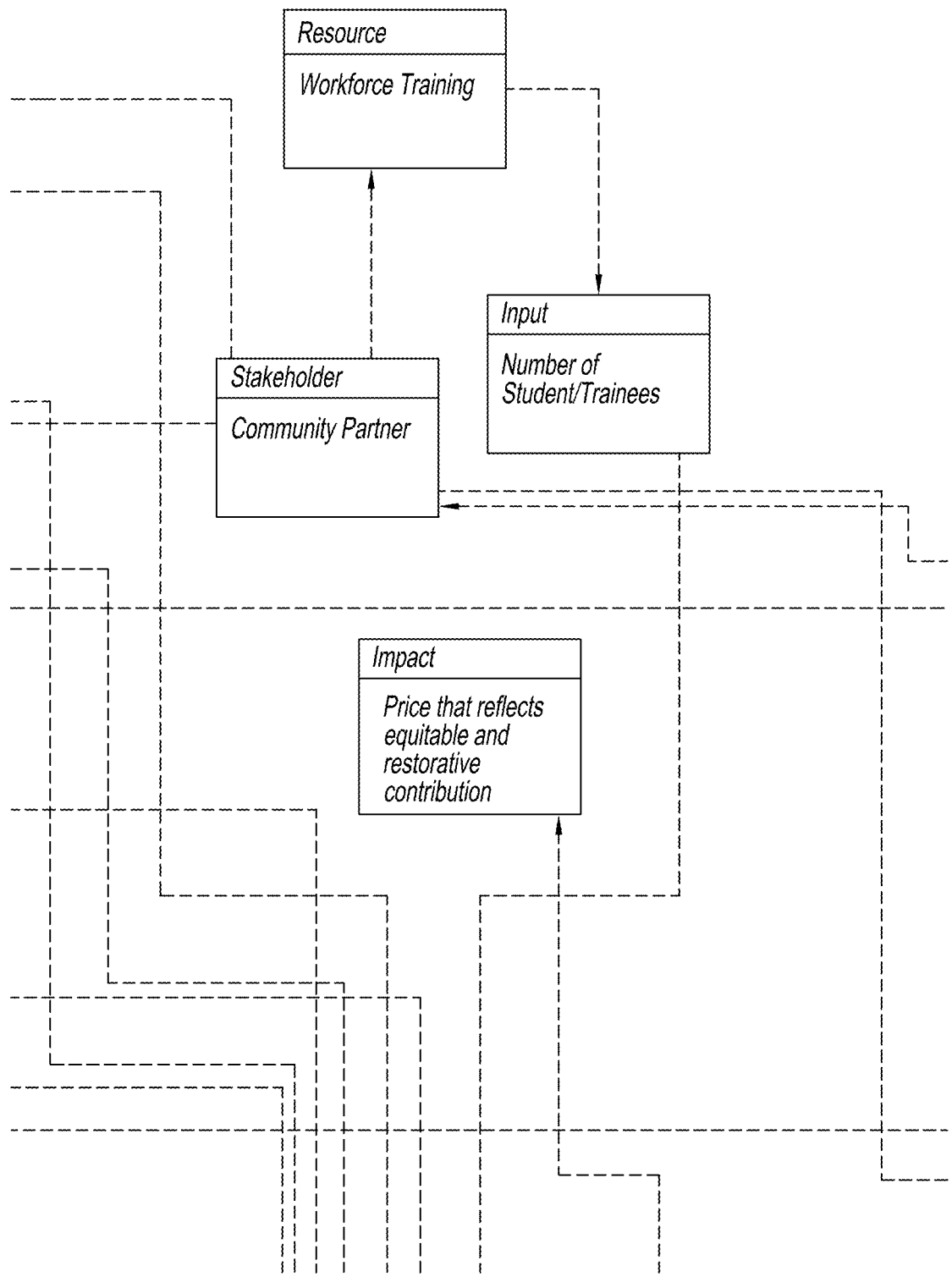
Figure 2D:
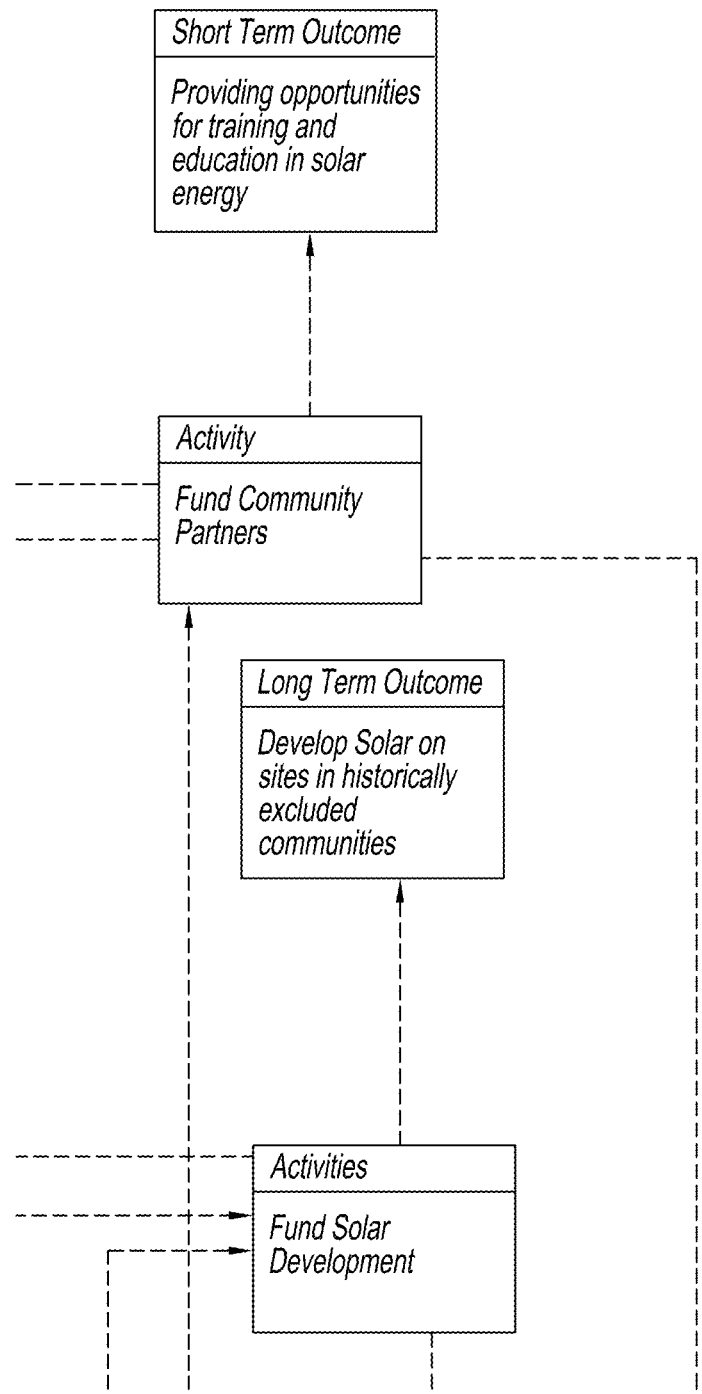
Figure 2E:
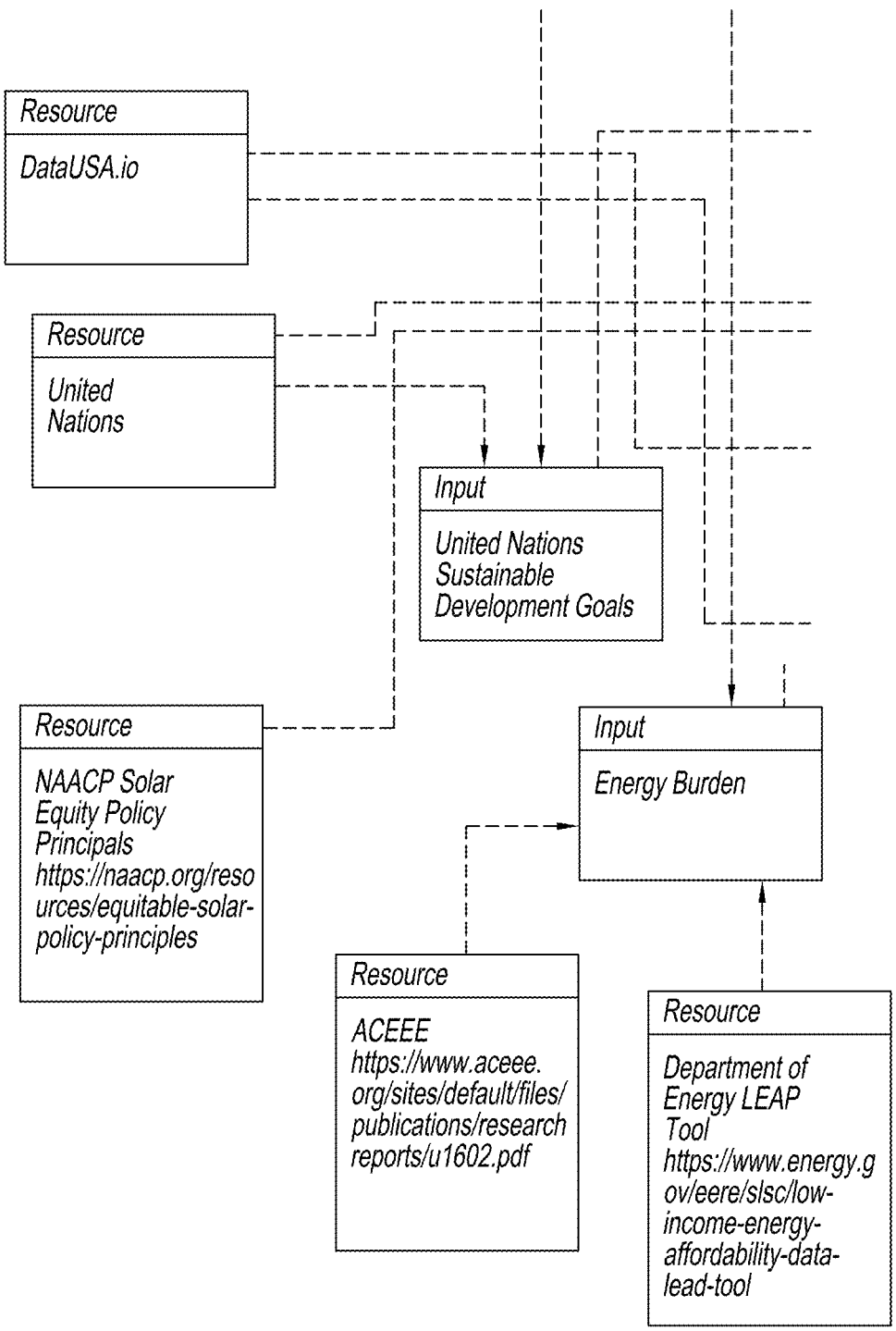
Figure 2F:
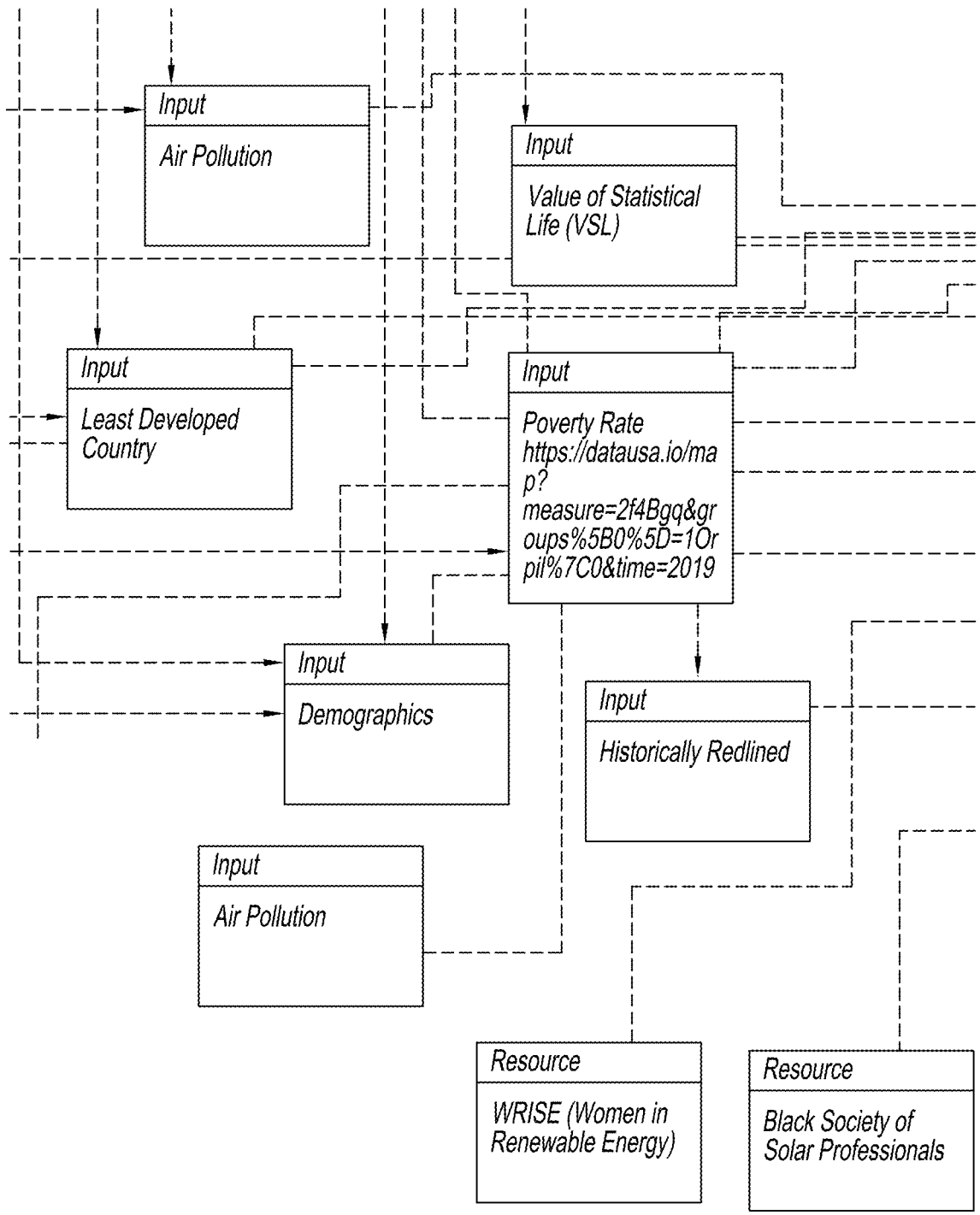
Figure 2G:
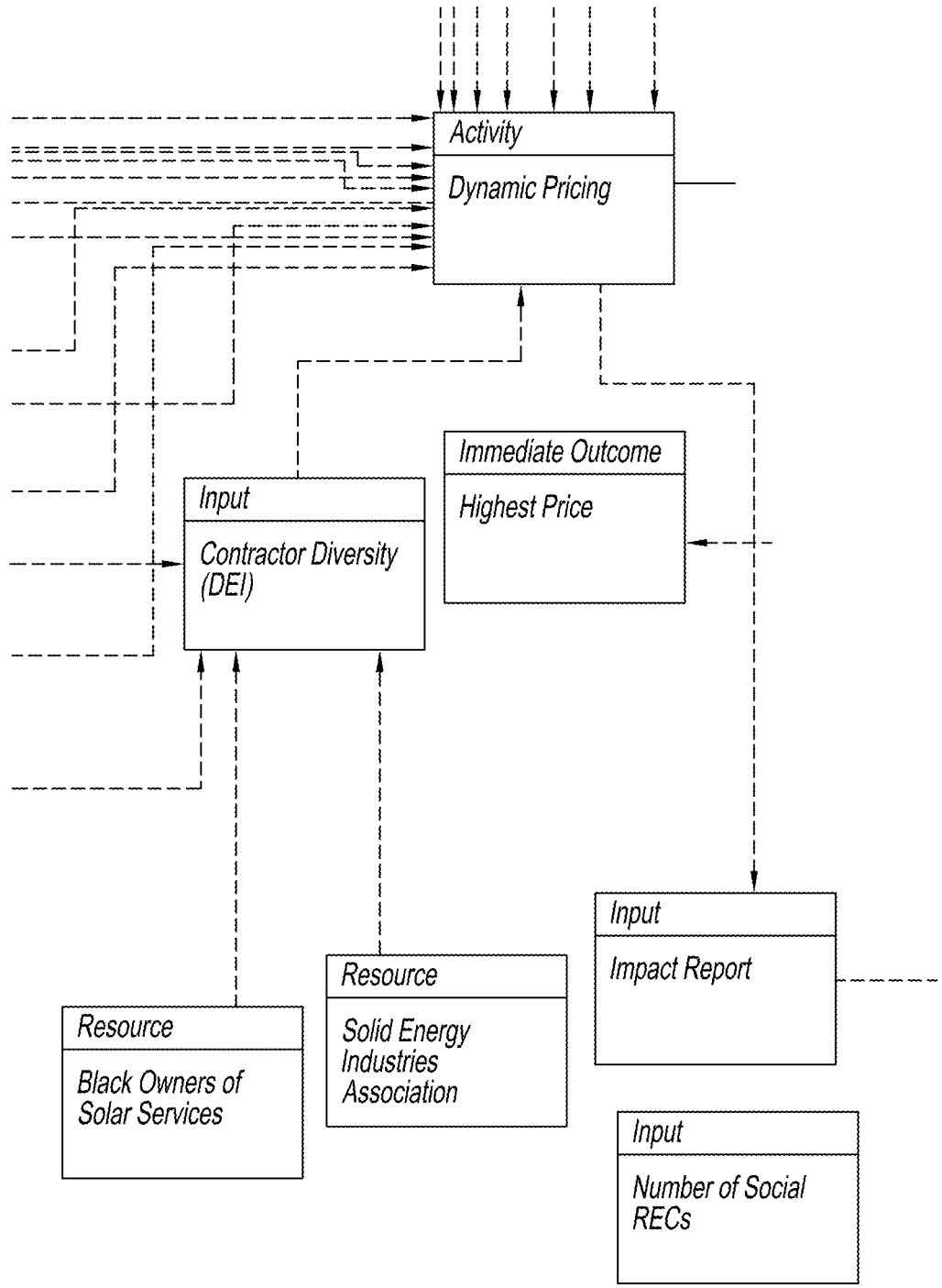
Figure 2H:
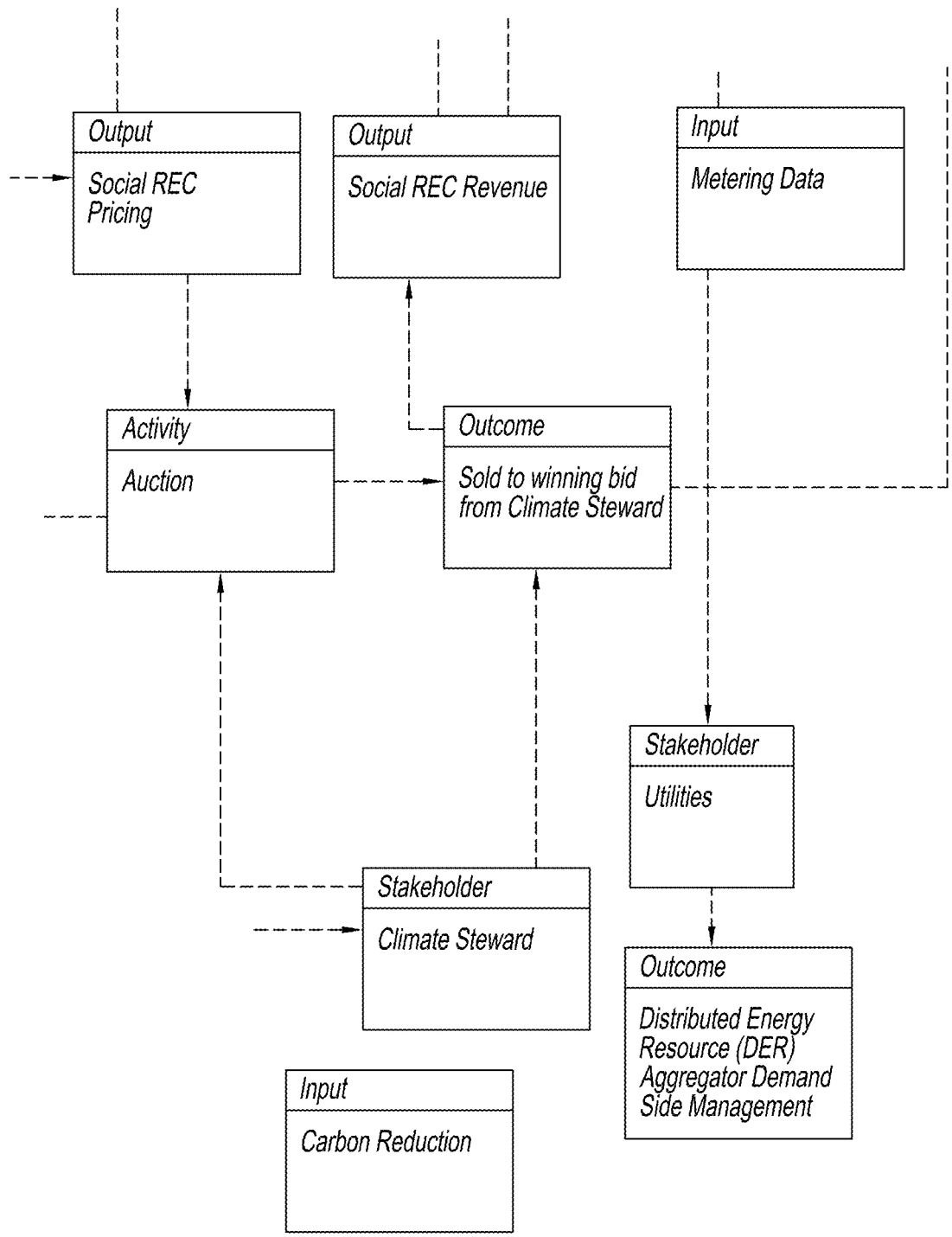

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Social Equity Renewable Energy Credit Datastructures and Distributed Generation Engine Apparatuses, Processes and Systems (hereinafter "SERECDG") transforms inputs, via SERECDG components (e.g., Climate Steward Collector, Community Collector, Allocation Engine, etc. components), into community apportionment values outputs. The SERECDG components, in various embodiments, implement advantageous features as set forth below.

INTRODUCTION

The SERECDG provides unconventional features (e.g., obtain, via the at least one processor, an energy equity participation request datastructure for the benefit of an underserved community; obtain a climate steward site datastructure from an energy production site; obtain a climate steward request datastructure from an energy production site, including: an energy credit donation value; obtaining a transfer of the energy credit donation value based the climate steward identifier and the energy credit donation value; determine apportionment values for community identifiers based on collected energy credit donation values and energy equity participation request; provide apportionment values to requesting communities' energy credit account identifier accounts based on their community identifier) that were never before available in environmental clean energy.

Markets

Climate change is upending lives across the globe. Although the repercussions vary, from floods in some regions and droughts in others, the impacts of a warming planet are felt by all. While still tragic, those with resources can rebuild, relocate, and recover. This is not the case among the world's most vulnerable populations. Whether disenfranchised by poverty, gender, race, or culture, climate change disproportionally effects those who cannot simply move out of the way.

Policies like renewable portfolio standards have greatly aided in the facilitation of renewable energy projects providing a lifeline for developers and consultants. However, when connecting the value of these policies and technology to the every-day person, particularly the disenfranchised, a chasm still exists. Renewable energy credits remain a mystery to most consumers making grass roots advocacy for supportive policies challenging. Even still, attempting to address this issue by explaining the complex nature of this important development resource is another difficult task all together.

Its been proven that nothing sells solar like more solar. Communities need to see and experience the benefits of renewable technologies for themselves. Much more powerful than a webinar or a lecture, directly connecting communities with the benefits of renewable energy credits sourced from on-site solar clearly demonstrates to them the value of renewable portfolio standards, of renewable energy credits, and of carbon reduction investments. Sourcing renewable energy credits from impact sites such as schools, affordable housing developments, senior housing, and non-profits multiplies the impact and directly connects more everyday people with the value of renewable energy.

The SERECDG provides ways in which large scale renewable energy buyers can most efficiently procure renewable energy credits to directly benefit and positively impact those most vulnerable to climate change.

In one embodiment, the SERECDG includes an energy attribute that increases equity in renewable energy development is disclosed. Social/Equity/Impact Renewable Energy Credits are a unique energy attribute product produced by the generation of renewable energy serves the public good and incorporates multiple value propositions such as community impact and marketing value.

As such, the SERECDG solves a number of problems. For example, making renewable energy economically viable is a challenge for a wide variety of stakeholders. Small projects lack the scale to attract financing. Policy restrictions on renewable energy in many markets prohibit achieving significant scale. Energy rates in several markets make it difficult for projects to produce an attractive return on investment without an additional revenue stream. Corporations are purchasing renewable energy credits (RECs), yet RECs lack tangible, and marketable impact. The most adversely effected by these market limitations are those consumers at the low end of the socioeconomic scale.

The market for energy attributes is often focused on larger scale renewable developments and does not include direct social and/or community impact.

Social/Equity/Impact Renewable Energy Credits are a unique energy attribute product produced by the generation of renewable energy serves the public good and incorporates multiple value propositions such as community impact and marketing value.

Distribution Generation

Making on-site, or distributed generation (DG) solar economically viable is a challenge for a wide variety of stakeholders. Small projects lack the scale to attract financing. Policy restrictions on renewable energy in many markets prohibit achieving significant scale. Energy rates in several markets make it difficult for projects to produce an attractive return on investment without an additional revenue stream. Corporations are purchasing renewable energy credits (RECs), yet not from DG solar arrays. RECs lack tangible, and marketable impact when purchased traditionally from utility-scale renewable energy. The most adversely effected by these market limitations are consumers those at the low end of the socioeconomic scale.

Social or Equity Renewable Energy Credits create an additional revenue stream to aid in the development of on-site solar. This unique energy attribute product is procured from on-site solar arrays, and is priced to reflect societal AND environmental impact. This market innovation also helps corporations to create more tangible and marketable value when procuring energy attributes as part of their overall carbon reduction AND community impact strategy.

Social/Equity Renewable Energy Credits (RECs) are a new energy attribute product that allows for 1) more revenue for solar projects. 2) More tangible, marketable community impact for buyers of energy attributes. 3) More access to solar for those traditionally without choice or access.

Renewable Energy Credits have been procured only from large utility scale renewables and include no appropriate provisions for community impact or the different economics of on-site solar development.

Social or Equity Renewable Energy Credits are a unique energy attribute product produced by the generation of renewable energy from on-site, or distributed generation (DG), renewable energy sources. Our unique process to produce a Social/Equity REC vets the DG sites, provides the adequate scale, facilitates the procurement, and often times provides the financing component for the renewable technology. This unique process produces the market innovation that is a Social/Equity Renewable Energy Credit.

1) Recruit and vet on-site renewables, or distributed generation (DG) sites for inclusion in Social/Equity REC portfolio 2) Provide tax equity, and various third-party financing resources for the development of DG renewables 3) Aggregate sites into a scaleable portfolio with qualitative societal impact, energy production metrics, and subsequent pricing for Social/Equity REC end purchaser.

4) Work with various energy attribute purchasers to include Social/Equity RECs within their carbon reduction portfolio and execute Social/Equity REC off-taker agreements 5) Use revenue from Social/Equity RECs to develop DG projects typically impeded from development without this additional revenue stream 6) Work with third parties to provide marketing and PR functions, workforce training and STEAM resources as part of the Solar Stewards Program and Social/Equity REC product.

7) Perform operations and maintenance for the DG renewable application to remain in compliance with all Social/Equity REC off-taker agreements and Power Purchase Agreements (PPAs.) for the term of the contracts.

8) Continue to monitor and quantify community and well as environmental impact both internally for the Solar Stewards Program and for external stakeholders.

1) Without vetted DG sites there are no opportunities for on-site generation to produce the MW/hrs (megawatt hours) needed to produce a Social/Equity REC.

2) Without a financing component (ie: tax equity and impact investment) these DG sites do not have the financial resources to be developed 3) These DG sites alone cannot produce the scale needed for a typical REC buyer or the financier in step 2, and thus an aggregated portfolio of multiple sites is needed 4) As the social/equity REC is a unique product, separate from anything currently on the market, special relationships and qualitative data is needed for the pricing, marketing, and sale of these energy attributes 5) The sale of the social/equity RECs provides the additional revenue to make the DG energy project economically viable for all stakeholders including the DG host site, the financiers, and the social/equity REC purchaser.

6) To deliver on the community impact ethos of social/equity RECs, the Solar Stewards Program facilitates additional community impact programs central to the DG energy project 7) Operations and maintenance of the DG project is imperative in honoring social/equity REC off-taker agreements and power purchase agreements 8) Monitoring and qualifying the community and environmental impacts is important to furthering the adoption of both environmental AND community impact inherent in the Social/Equity Renewable Energy Credit product If we vet and obtain enough distributed generation (DG) host sites we can reach enough scale to be considered for tax equity/impact investment and financing.

If we are at scale, then we can generate enough on-site energy to be attractive to a Renewable Energy Credit off-taker.

If we can quantify the community impact of the DG project, we can price the Social/Equity REC accordingly to make the project economically viable where it typically may not otherwise be for all stakeholders. This specifically mechanism generating a market rate IRR (internal rate of return) for the investors and a beneficial PPA (power purchase agreement) rate for the DG host site as well as sufficient proceeds for development and legal costs.

The Solar Stewards Program is a vertically integrated business process that facilitates all aspects of this interlinked value chain to bring the unique Social/Equity REC product to market, which in turn creates a competitive advantage in the development of DG renewable projects.

Social/Equity Renewable Energy Credits (RECS) allow for more community impact via on-site, or distributed generation (DG) renewables by providing an additional income stream to make small scale DG projects economically viable. Through the Solar Stewards Program process, we obtain, and vet a large portfolio of DG sites to reach enough scale for third-party financing, as well as create enough volume for the typical energy attribute purchaser/offtaker. Because of the direct impact of providing on-site or DG renewables to these host sites and with our qualitative impact metrics, we can command a price for our Social/Equity RECs that generates enough internal rate of return (IRR) to satisfy our third-party financiers and delivers a Power Purchase Agreement (PPA) that offers the DG host site significant savings on their electric utility bill. Social/Equity RECs also provide for the development and legal costs associated with the complexity of DG solar development across an aggregated portfolio. To fulfill the Social/Equity Impact inherent in a Social/Equity Renewable Energy Credit, the Solar Stewards Program also facilitates various workforce development, advocacy, and STEAM programs utilizing the on-site renewable technology.

1) Locate and vet credit worthy sites in states that allow for third party renewable energy financing until scale is reached, typically over 1 MW (megawatt). This could look like 20 individual schools, or 10 affordable housing buildings, for example. Vetting includes doing all pre development work from obtaining utility bills, to sizing DG systems, obtaining pricing, specking equipment and getting the DG host site ready to enter into a PPA. (power purchase agreement).

2) Locate and vet financiers, impact investors, tax equity investors, willing to finance a portfolio of distributed generation host sites at a competitive rate and with flexible terms. This could be the standard 20 yr PPA, although usually less to coincide with the much shorter term of most REC off-taker agreements.

3) Obtain impact metrics, including DG site user demographics, income levels and other intrinsic values used to determine the pricing for the "Social/Equity REC product.

4) Locate the appropriate energy attribute buyer for Social/Equity RECs though key relationships and market and sell them on the best price/term for all stakeholders in the Solar Stewards Program. These general stakeholders include: 1) The DG host site where the renewables are located. 2) The community that uses the DG host site 3) The financier providing capital to deploy the DG assets are located 4) The Solar Stewards Program development costs which include legal and EPC costs (engineering, procurement, and construction, aka a solar installer).

5) Execute all Off-taker and PPA agreements and manage the development of the DG project portfolio.

6) Monitor all operations and maintenance and bill the DG Solar host sites to ensure they are in compliance with the Social/Equity REC offtaker agreement, the PPA for the term of all agreements.

7) Deliver on the additional impact inherent in the Social/Equity REC product via the Solar Stewards Program by facilitating community impact programs using the DG renewable as a training/learning tool, as well as public relations and advocacy.

One element, the trade secret of the Solar Stewards Program, is the ability to create a unique energy attribute, (what we've named Social or Equity Renewable Energy Credits) that are sourced from distributed generation renewables located on site, create a direct community impact, and command a unique price because of this additional value, where traditional RECs do not. This added value creates the unique pricing that enables the Solar Stewards program to develop more economically viable DG projects. It's a virtuous cycle and a fully integrated process.

Similar claims to the community impact and subsequent value of RECs generated from DG sources could enter the market, however without the vertically integrated Solar Stewards Program Process that ensures legitimacy and tangible impact throughout the value chain, there is the potential for misuse and "greenwashing" of the Social/Equity REC product.

On-site renewable developers can engage the Solar Stewards Program to realize additional project revenue from the sale of our Social/Equity renewable energy credits.

DG Host Sites can realize a reduction in their utility spend by entering into a Solar Stewards Power Purchase Agreement Our Social/Equity REC purchasers/offtakers realize both an environmental goal in the form of carbon reduction, as well as community impact and marketing/PR opportunities associated with tangible, on-site renewables.

Tax Equity investors get all affiliated tax credits with the array, impact investors receive a competitive return.

Residents of the community in which the DG site is based are provided with workforce development resources, STEAM learning tools etc.

The Social/Equity Renewable Energy Credit Product can also be utilized within a blockchain framework that will allow for a streamlining/automation of the authentication of the Social/Equity REC product. As blockchain advances in this application, it will make off-grid and international DG sites eligible for purchase. This added revenue will facilitate the development of more DG renewables, ie: Solar Stewards process.

The business method and process of the Solar Stewards Program creates the opportunity for the scaling, and financing of DG renewables combined with community impact to yield a unique social impact product in the energy attribute space. The same could be applied to Carbon Offsets and other future energy attribute frameworks. Energy attributes typically indicate one megawatt-hour of electricity was generated and fed into the grid from an eligible renewable source.

An Energy Attribute that Increases Equity in Renewable Energy Development.

Making renewable energy economically viable is a challenge for a wide variety of stakeholders. Small projects lack the scale to attract financing. Policy restrictions on renewable energy in many markets prohibit achieving significant scale. Energy rates in several markets make it difficult for projects to produce an attractive return on investment without an additional revenue stream. Corporations are purchasing renewable energy credits (RECs), yet RECs lack tangible, and marketable impact. The most adversely effected by these market limitations are consumers those at the low end of the socioeconomic scale.

Social/Equity/Impact Renewable Energy Credits create an additional revenue stream to aid in the more equitable development of renewable energy. This unique energy attribute product is procured from sites serving the public good, and is priced to reflect multiple value propositions including marketing, societal, and environmental value. Our product helps market players create more tangible and marketable value when procuring energy attributes to accomplish multiple goals including carbon reduction, community engagement, marketing and Environmental, Social, and Governance goals.

Social/Equity/Impact Renewable Energy Credits (RECs) are a new energy attribute product that allows for 1) better economics for renewable projects serving the public good 2) More tangible, visible marketing value for buyers of energy attributes. 4) More opportunities for community impact for all stakeholders 3) More access to clean energy for those traditionally without choice or access.

Renewable Energy Credits are currently and historically procured only from large utility scale renewables and include no appropriate provisions for community impact or the different economics of on-site solar development.

The market for energy attributes is typically focused on larger scale renewable developments and does not include direct social and/or community impact.

Traditional energy attributes do not account for the equitable development of renewable assets.

Social/Equity/Impact Renewable Energy Credits are a unique energy attribute product produced by the generation of renewable energy serves the public good and incorporates multiple value propositions such as community impact and marketing value.

Our unique process to produce a Social/Equity REC vets the DG sites, provides the adequate scale, facilitates the procurement, and often times provides the financing component for the renewable technology. This unique process produces the market innovation that is a Social/Equity Renewable Energy Credit.

1) Recruit and vet renewable development sites serving the public good

2) Evaluate project economics, and Environmental, Social, and Governance metrics, marketing value, and qualitative and quantitative data.

3) Aggregate sites into a scalable portfolio with data to yield appropriate pricing for all stakeholders, including off-takers.

4) Work with various energy attribute purchasers to include Social/Equity/Impact RECs within their carbon reduction portfolio, marketing and PR strategy, and Environmental, Social, and Governance goals. Execute off-taker agreements.

5) Use revenue from Social/Equity/Impact RECs to develop and sustain renewable projects typically impeded from development without this additional revenue stream 6) Coordinate marketing and PR functions, and community and stakeholder engagement and impact.

The recruitment and qualifying of applicable renewable generation sources is key to determining the eligibility of a Social/Equity/Impact REC and obtaining the scale to attract buyers. (elements 1-4) The revenue generated by Social/Equity/Impact RECs is factored into project economics to help development. (step 5) The application and marketing of the product and benefits is part of the value to the off-taker. (step 6)

1) Without vetted DG sites there are no opportunities for on-site generation to produce the MW/hrs (megawatt hours) needed to produce a Social/Equity REC.

2) Without a financing component (ie: tax equity and impact investment) these DG sites do not have the financial resources to be developed 3) These DG sites alone cannot produce the scale needed for a typical REC buyer or the financier in step 2, and thus an aggregated portfolio of multiple sites is needed 4) As the social/equity REC is a unique product, separate from anything currently on the market, special relationships and qualitative data is needed for the pricing, marketing, and sale of these energy attributes 5) The sale of the social/equity RECs provides the additional revenue to make the DG energy project economically viable for all stakeholders including the DG host site, the financiers, and the social/equity REC purchaser.

6) To deliver on the community impact ethos of social/equity RECs, the Solar Stewards Program facilitates additional community impact programs central to the DG energy project 7) Operations and maintenance of the DG project is imperative in honoring social/equity REC off-taker agreements and power purchase agreements 8) Monitoring and qualifying the community and environmental impacts is important to furthering the adoption of both environmental AND community impact inherent in the Social/Equity Renewable Energy Credit product If we vet and obtain enough renewable generation directly serving the public good than this aggregate is more attractive for funding and a Social/Equity/Impact Renewable Energy Credit off-taker. If we can include the additional values of community impact, marketing, and visibility of the renewable energy source, Social/Equity/Impact RECs can be priced to make the project economically viable where it typically may not otherwise be for all stakeholders.

By following the above listed elements, a unique energy attribute is created which lends more equity to renewable energy development.

The mechanism disclosed herein includes of the above listed elements

This specifically mechanism generating a market rate IRR (internal rate of return) for the investors and a beneficial PPA (power purchase agreement) rate for the DG host site as well as sufficient proceeds for development and legal costs.

The Solar Stewards Program is a vertically integrated business process that facilitates all aspects of this interlinked value chain to bring the unique Social/Equity REC product to market, which in turn creates a competitive advantage in the development of DG renewable projects.

Social/Equity Renewable Energy Credits (RECS) allow for more equitable renewable energy development by providing an additional income stream to make renewable energy applications benefiting the public good economically viable to all stakeholders.

Through the Solar Stewards Program, we obtain, and vet a large portfolio of DG sites to reach enough scale for third-party financing, as well as create enough volume for the typical energy attribute purchaser/offtaker. Because of the direct impact of providing on-site or DG renewables to these host sites and with our qualitative impact metrics, we can command a price for our Social/Equity RECs that generates enough internal rate of return (IRR) to satisfy our third-party financiers and delivers a Power Purchase Agreement (PPA) that offers the DG host site significant savings on their electric utility bill. Social/Equity RECs also provide for the development and legal costs associated with the complexity of DG solar development across an aggregated portfolio. To fulfill the Social/Equity Impact inherent in a Social/Equity Renewable Energy Credit, the Solar Stewards Program also facilitates various workforce development, advocacy, and STEAM programs utilizing the on-site renewable technology.

1) Locate and vet credit worthy sites in states that allow for third party renewable energy financing until scale is reached, typically over 1MW (megawatt). This could look like 20 individual schools, or 10 affordable housing buildings, for example. Vetting includes doing all pre development work from obtaining utility bills, to sizing DG systems, obtaining pricing, specking equipment and getting the DG host site ready to enter into a PPA. (power purchase agreement).

2) Locate and vet financiers, impact investors, tax equity investors, willing to finance a portfolio of distributed generation host sites at a competitive rate and with flexible terms. This could be the standard 20 yr PPA, although usually less to coincide with the much shorter term of most REC off-taker agreements.

3) Obtain impact metrics, including DG site user demographics, income levels and other intrinsic values used to determine the pricing for the "Social/Eqiuty REC product.

4) Locate the appropriate energy attribute buyer for Social/Equity RECs though key relationships and market and sell them on the best price/term for all stakeholders in the Solar Stewards Program. These general stakeholders include: 1) The DG host site where the renewables are located. 2) The community that uses the DG host site 3) The financier providing capital to deploy the DG assets are located 4) The Solar Stewards Program development costs which include legal and EPC costs (engineering, procurement, and construction, aka a solar installer).

5) Execute all Off-taker and PPA agreements and manage the development of the DG project portfolio.

6) Monitor all operations and maintenance and bill the DG Solar host sites to ensure they are in compliance with the Social/Equity REC offtaker agreement, the PPA for the term of all agreements.

7) Deliver on the additional impact inherent in the Social/Equity REC product via the Solar Stewards Program by facilitating community impact programs using the DG renewable as a training/learning tool, as well as public relations and advocacy.

One element, is the ability to create a unique energy attribute, (entitled Social/Equity/Impact Renewable Energy Credits) from renewable energy generation that serves the public good, and price this product to include all value propositions as described for the benefit of all stakeholders. that are sourced from distributed generation renewables located on site, create a direct community impact, and command a unique price because of this additional value, where traditional RECs do not. This added value creates the unique pricing that enables the Solar Stewards program to develop more economically viable DG projects. It's a virtuous cycle and a fully integrated process.

Similar claims to the community impact and subsequent value of RECs generated from renewable sources located near, on, or serving the public good could enter the market, however without elements mentioned herein to ensure legitimacy and tangible impact throughout the value chain that constitutes the Social/Equity/Impact REC product, there is the potential for misuse and "greenwashing."

Renewable energy developers can utilize Social/Equity/Impact renewable energy credits to realize additional project revenue on projects serving the public good.

Renewable energy producers can realize a new revenue stream and/or benefit from better project economics and savings on energy expenditures.

Our Social/Equity/Impact REC purchasers/off-takers realize both an environmental goal in the form of carbon reduction, as well as community impact and marketing/PR opportunities.

Tax Equity investors get all affiliated tax credits with the array, impact investors receive a competitive return.

Residents of the community in which the DG site is based are provided with workforce development resources, STEAM learning tools etc.

The Social/Equity/Impact Renewable Energy Credit Product can also be utilized within a blockchain framework that will allow for a streamlining/automation of the authentication of the Social/Equity/Impact REC product.

The inclusion of both qualitative and quantitative data to price an attribute to include and produce more equitable outcomes can apply to data, machine learning, water and mineral rights, and all sustainability measures.

The Social/Equity/Impact Renewable Energy Credit Product can also be utilized within a blockchain framework that will allow for a streamlining/automation of the authentication of the Social/Equity/Impact REC product. As blockchain advances in this application, it will make off-grid and international DG sites eligible for purchase. This added revenue will facilitate the development of more DG renewables, ie: Solar Stewards process.

The business method and process of the Solar Stewards Program creates the opportunity for the scaling, and financing of DG renewables combined with community impact to yield a unique social impact product in the energy attribute space. The same could be applied to Carbon Offsets and other future energy attribute frameworks. Energy attributes typically indicate one megawatt-hour of electricity was generated and fed into the grid from an eligible renewable source.

Social Equity Impact Renewable Energy

As stated above, making renewable energy economically viable is a challenge for a wide variety of stakeholders. Small projects lack the scale to attract financing. Policy restrictions on renewable energy in many markets prohibit achieving significant scale. Energy rates in several markets make it difficult for projects to produce an attractive return on investment without an additional revenue stream. Corporations are purchasing renewable energy credits (RECs), yet RECs lack tangible, and marketable impact. The most adversely effected by these market limitations are those consumers at the low end of the socioeconomic scale. The invention claimed here solves this problem.

Social/Equity/Impact Renewable Energy Credits create an additional revenue stream to aid in the more equitable development of renewable energy. This unique energy attribute product is procured from sites serving the public good, and is priced to reflect multiple value propositions including marketing, societal, and environmental value. Our product helps market players create more tangible and marketable value when procuring energy attributes to accomplish multiple goals including carbon reduction, community engagement, marketing and Environmental, Social, and Governance goals.

The claimed invention differs from what currently exists. Social/Equity/Impact Renewable Energy Credits (RECs) are a new energy attribute product that allows for 1) better economics for renewable projects serving the public good 2) More tangible, visible marketing value for buyers of energy attributes. 4) More opportunities for community impact for all stakeholders 3) More access to clean energy for those traditionally without choice or access.

This invention is an improvement on what currently exists. Social/Equity/Impact Renewable Energy Credits (RECs) are a new energy attribute product that allows for 1) better economics for renewable projects serving the public good 2) More tangible, visible marketing value for buyers of energy attributes. 4) More opportunities for community impact for all stakeholders 3) More access to clean energy for those traditionally without choice or access.

Traditional energy attributes do not account for the equitable development of renewable assets.

Social/Equity/Impact Renewable Energy Credits are a unique energy attribute product produced by the generation of renewable energy serves the public good and incorporates multiple value propositions such as community impact and marketing value.

The SERECDG can produce data sets.
In One Embodiment the SERECDG Includes the Following Process Elements:

1) Recruit and vet renewable development sites serving the public good
2) Evaluate project economics, and Environmental, Social, and Governance metrics, marketing value, and qualitative and quantitative data.
3) Aggregate sites into a scalable portfolio with data to yield appropriate pricing for all stakeholders, including off-takers.
4) Work with various energy attribute purchasers to include Social/Equity/Impact RECs within their carbon reduction portfolio, marketing and PR strategy, and Environmental, Social, and Governance goals. Execute off-taker agreements.
5) Use revenue from Social/Equity/Impact RECs to develop and sustain renewable projects typically impeded from development without this additional revenue stream
6) Coordinate marketing and public relations functions, and community and stakeholder engagement and impact.

In One Embodiment the Relationship Between the Components Includes:

The recruitment and qualifying of applicable renewable generation sources are key to determining the eligibility of a Social/Equity/Impact REC and obtaining the scale to attract buyers. (elements 1-4) The revenue generated by Social/Equity/Impact RECs is factored into project economics to help development. (step 5) The application and marketing of the product and benefits is part of the value to the off-taker. (step 6)

Instantiating the SERECDG:

By following the above listed process elements, a unique energy attribute is created which lends more equity to renewable energy development.

If we vet and obtain enough renewable generation directly serving the public good than this aggregate is more attractive for funding and a Social/Equity/Impact Renewable Energy Credit off-taker. If we can include the additional values of community impact, marketing, and visibility of the renewable energy source, Social/Equity/Impact RECs can be priced to make the project economically viable where it typically may not otherwise be for all stakeholders.

Example Implementations of the SERECDG:

The mechanism disclosed herein includes of the above-listed elements

One element, is the ability to create a unique energy attribute, (entitled Social/Equity/Impact Renewable Energy Credits) from renewable energy generation that serves the public good, and price this product to include all value propositions as described for the benefit of all stakeholders.

Similar claims to the community impact and subsequent value of RECs generated from renewable sources located near, on, or serving the public good could enter the market, however without elements mentioned herein to ensure legitimacy and tangible impact throughout the value chain and for all stakeholders, there is the potential for misuse and "greenwashing" of the Similar claims to the community impact and subsequent value of RECs generated from renewable sources located near, on, or serving the public good could enter the market, however without elements mentioned herein to ensure legitimacy and tangible impact throughout the value chain that constitutes the Social/Equity/Impact REC product, there is the potential for misuse and "greenwashing."

Employing the SERECDG:

Renewable energy developers can utilize Social/Equity/Impact renewable energy credits to realize additional project revenue on projects serving the public good.

Renewable energy producers can realize a new revenue stream and/or benefit from better project economics and savings on energy expenditures.

Our Social/Equity/Impact REC purchasers/off-takers realize both an environmental goal in the form of carbon reduction, as well as community impact and marketing/PR opportunities.

Additionally: The Social/Equity/Impact Renewable Energy Credit Product can also be utilized within a blockchain framework that will allow for a streamlining/automation of the authentication of the Social/Equity/Impact REC product.

The inclusion of both qualitative and quantitative data to price an attribute to include and produce more equitable outcomes can apply to data, machine learning, water and mineral rights, and all sustainability measures.

Also, the SERECDG: data sets

Equity Grant

In one embodiment, the SERECDG is a social enterprise working to include an equity value within Renewable Energy Credit (REC) markets. Adding and attributing an additional value to RECs generated on sites that serve the community will aid in the development of more distributed generation assets in marginalized and low income communities. These specialized solar applications therefore help alleviate climate change, create opportunities for community resilience, serve as a workforce training and advocacy tool, create monetary savings for the community, and foster more equitable outcomes in solar deployment both at a local and global scale.

The SERECDG provides frameworks for the inclusion of the social value to distributed energy resources to then be applied and piloted with local and regional partner within the Allegheny region. The application of our Social RECs™ will reduce energy costs, create workforce training and learning opportunities, and provide opportunities for extra power redundancy for schools, hospitals, affordable housing, municipalities, and other important community serving institutions.

SERECDG is able to implement our Social REC solution by working closely with two well-established national and international solutions in distributed ledger technology and clean energy finance.

Working with our partners, Blockchain Authentication and Inclusive Prosperity Capital, SERECDG will provide capital investment, energy attribute authentication, and renewable energy trading capabilities to local communities, while engaging the private sector to value the energy generated from marginalized, low income, and disenfranchised communities at a cost that includes an equity value.

Blockchain Authentication (e.g., https://www.powerledger.io) Blockchain Authentication provides cutting-edge distributed ledger software solutions to efficiently and securely trade renewable energy credits. This technology enables SERECDG to aggregate Social RECs from enough distributed generation solar sites so as to achieve scale in a cost-effective manner. By including this technology, our Solar Host Sites are also afforded the opportunity to leapfrog into the 21-century energy trading distributed energy resource (DER) marketplace. At the local utility's discretion, our Solar Host Sites have the capability to participate in peer to peer energy trading to allow for increased revenue and resiliency for energy generating assets.

Environmental Commodities Trading

Blockchain Authentication platform technology is being used to ensure the trading of environmental commodities such as renewable energy certificates and carbon credits, are more transparent, secure, and efficient.

The market for trading environmental commodities is rapidly increasing and needs our proprietary blockchain technology platform to track energy from renewable sources and monetize the environmental attributes-removing the risks including of fraud and double counting. You can trust our environmental commodities trading platform.

Inclusive Prosperity Capital (e.g., https://www.inclusiveprosperitycapital.org) is a non-profit clean energy social investment fund and acts as SERECDG third party Power Purchase Agreement (PPA) partner. With IPC, SERECDG is able to offer our Solar Host Sites the opportunity to deploy clean energy on-site without the up-front capital for equipment and labor, or operations and maintenance costs. In addition, IPC functions as a tax equity partner, and lends our solar host sites the unprecedented buy-out option, giving SERECDG Host sites the opportunity to own the solar assets prior to the end of a PPA contract.

Inclusive Prosperity Capital addresses the growing economic and racial disparities in clean energy finance by increasing access to capital for low-to-moderate income communities and nontraditional credits like nonprofits, faith-based organizations, housing authorities, schools, and smaller businesses. Through our suit products and network of partners, Inclusive Prosperity Capital will reduce the energy burden on residents, improve the health and resiliency of homes and multifamily properties, and help businesses and non-profits in distressed communities.

Inclusive Prosperity Capital is a strategic partner of the Connecticut Green Bank, focused on scaling the Green Bank's work in Connecticut, and expanding this successful model into other states and regions by accessing new capital sources.

Inclusive Prosperity Capital exists at the intersection of green energy finance, community development, and climate impact.

Dana Redden, with her company Solar Concierge, did the first PPA in Georgia. This partnership made many city buildings 40% solar and creates between 1.5 and 2 MW of energy per year. SERECDG will apply this experience to Dana's homestate, PA.

In the interim, working with national and international REC brokerages, SERECDG was able to identify the unique niche first envisioned in this marketplace, and begin to self-develop 1MW of distributed generation solar located in the birthplace of Martin Luther King jr, and the late Civil Rights champion John Lewis's 5th district.

In 2020, this focus on both environmental and social justice has been thrust to the forefront, and demand for our Social REC product outpaced supply. SERECDG then began to partner with solar developers focused on the LMI marketplace, while seeking resources to further develop our equity product.

The SERECDG project represents an innovative and potentially transformational solution to a known challenge related to affordability, capital cost, flexibility in response to grid conditions and market signals, and/or $CO_2$ capture rate.

SERECDG addresses all of the following issues in regard to market transformation:

Affordability and Capital Costs: Because of the small scale of distributed generation solar sites, and nontaxable status of most community serving entities, third-party solar financing has been mostly inaccessible for the schools, hospitals, universities, affordable housing authorities, and churches that can benefit from solar the most. SERECDG has located and vetted a third-party impact investment partner to fulfil this gap. By extension, even with this missing piece project economics are strained. The addition of Social REC revenue within the solar application makes the project economics viable, and reduces energy expenditures for community serving organizations.

Flexibility in response to grid conditions: SERECDG develops distributed energy resources helping to contribute to a smart and responsive grid. In addition, Social REC revenue allows for additional project capabilities including storage ready solar applications that can operate in the event of grid failure and with the addition of battery technology can then provide emergency power. Lastly our use of cutting edge blockchain technology, afforded by the sale of solar RECs allows our host sites state of the art smart grid capabilities. Market Signals, and/or $CO_2$ capture rate: The world is moving towards a clean and renewable energy future that includes the decentralization of energy and the smart technology to operate distributed energy resources. In addition, the transformation of the clean energy economy is more than ever focused on equity and inclusiveness. SERECDG speaks to all of these market signals, mitigating $CO_2$ by fostering more MW of solar energy, and aiding the infrastructure of the future with a equity component.

The SERECDG multi-disciplined team of subject matter experts will focus our research and development on the further development of a formula based on existing data sets and information to generate a proprietary formula to inform the value of a renewable energy credit based on the attributes of the site where the credit is generated.

In one embodiment, the SERECDG provides framework for the mathematical elements.

A multiple regression model is the proposed model for predicting the value of a renewable energy credit. The value of an energy credit can be predicted by a set of independent variables, which will be determined based on their predictive power in the model. The multiple regression model will be the basis for generating an estimated multiple regression equation of the following form:

$$y=b0+b1x1+b2x2+ \ldots +bnxn$$

where y is the predicted value of a renewable credit, $x1, x2, \ldots, xn$ are the chosen set of independent variables, and $b0, b1, \ldots, bn$ are the set of linear coefficients from the analysis.

The data set used to create the model must meet the following requirements:

Linearity between the dependent and each chosen independent variable

No multicollinearity between independent variables

Independence (zero correlation) between residuals for time series data

Homoscedasticity-constant variance of residuals

Normal distribution of residuals

Given that the assumptions are met, the estimated multiple regression equation will predict the value of a renewable energy credit within an confidence interval for values of the independent variables that fall within the range of the data used to create the model. The predictive power of the model will diminish as input variable values diverge from their respective ranges found in the data set.

The validity of the model will be assessed using new data points for renewable energy credits where the actual value can be compared to the predicted value. Error analysis for the new data points will inform updates to the model to reduce errors and bias.

In one embodiment, the SERECDG may provide and fund the collaborative efforts of the SMEs to create the equity formula used to inform Social REC pricing.

SERECDG has been self-funded since inception in 2015. Although a bootstrap model is limited, particularly in a scale-up phase, we have had immense success with extremely limited resources.

Equity Formula

In one embodiment, the SERECDG assess existing equity and energy metrics, and establish parameters and frameworks to inform a formula that can standardize the inclusion a value derived from social attributes. This phase informs the process with real world data.

Equity Formula Parameters Include

Obtain data sets and develop frameworks
Energy Burden
Brownfield data
Demographics
Grid mix
Others
Collaboration on applications and values
Begin inputs into multiple regression models
Focus group with market participants
Potential Social REC buyers/climate stewards
PPA provider/Impact investor
Solar Host Sites
Apply regional market data obtained from feasibility phase Project Development Project Feasibility The project feasibility established the scope and goals for the project to set it up for long term success. SERECDG determined the project's feasibility by collecting necessary data to determine what opportunities the client and project can pursue moving forward. This analysis also informs the cost of the Social RECs, and the PPA pricing.

In this element, a site evaluation is conducted to calculate energy information:
Energy analysis
Site Selection
Shade Analysis
System Sizing
Applicable rebates and tax incentives With the completed site analysis, Go/No Go decisions will be conducted to establish if and where the solar can be installed, the appropriate project sizing, and total project costs. With this data, SERECDG will evaluate how many MWhs will be available for purchase, the future Renewable Energy Credit's social value from the project impact, and identifying Climate Stewards or social REC buyers.

Identify Project Teams and Stakeholders

Identifying stakeholders and team members is important to the successful development of the project and ensuring the project is developed with community input. Stakeholders and team members will include community leaders and members, the utility company representatives, appropriate government personnel, and engineering, procurement, construction (EPC) firm.

To select the best EPC firm, SERECDG will obtain multiple bids, and if applicable, generate a formal request for proposal RFP to ensure the project is getting the best deal that is tailored to its specific needs and interests. This step will also obtain necessary permits and approvals, and establish the project design.

Solidify Funding

SERECDG will organize, decide upon, and complete these logistical tasks so that the physical solar installation is as seamless, cost-effective, and sustainable as possible. Our impact investment PPA partner will then receive project data in order to arrange for third-party funding. During this funding phase, SERECDG will apply empirical data obtained in this process to inform the development of the social REC formula.

Project Development
Project Development
Identify regional pilot site and collect project data
Assess portfolio of sites, if and where solar can be installed
Utilize project data to inform Social REC pricing
Conduct site assessments
Identify Project Teams and Stakeholders
Explore potential of solar training workshops
Establish development teams
Project design and engineering/Potential RFP Process
Solidify financing arrangements
Installer bids and pricing
Complete and submit PPA/financial applications
Financing approvals Project Implementation In this phase, construction and interconnection of the solar arrays takes place. SERECDG guides the implementation of a workforce development and onsite training program, so community members can benefit from the construction process. At the end of the construction phase that has been closely and effectively managed, a fully functioning solar system is operating to capitalize and monetize the energy from the sun.

Marketing and media strategies are used throughout the project implementation phase to add value to the Social REC offering, function as a clean energy advocacy and economic development tool, to maximize project exposure, gain funder visibility, and encourage future projects.

Project Implementation
  Award the project to the appropriate EPC
  Workforce development and onsite training
  Construction
  Extra construction time for storage ready applications
  Media and marketing programs Project Monitoring Project monitoring and the sale of social RECs created from the project is the final step in a SERECDG project. The phase is continual, and therefore so are the benefits of the project. In this step, operation and maintenance agreements will be carried out to ensure the solar project is running efficiently and providing maximum energy. As solar energy is produced, the social RECs will be sold through the implemented blockchain technology. At this point, the project will be completing its intended goal of promoting social equity through lifting energy burdens and environmental sustainability.

Project Monitoring and Social REC Sales
  Execute Operations and Maintenance Agreements
  Monitor systems with PowerLedger platform
  Increase efficiency
  Begin transacting social RECs In one embodiment, the SERECDG may be located in Johnstown, PA and may act as a hub, by thinking global and acting local, the impact of a successful equity metric applied to renewable energy procurement has enormous global implications, with the potential to foster economic development and reduce dependence on fossil fuels on a global scale, making the Alleghenies a leader in global energy innovation once again.

SERECDG® is a social enterprise working to include an equity value within Renewable Energy Credit (REC) markets. Adding and attributing an additional value to RECs generated on sites that serve the community will aid in the development of more distributed generation assets in marginalized and low income communities. These specialized solar applications therefore help alleviate climate change, create opportunities for community resilience, serve as a workforce training and advocacy tool, create monetary savings for the community, and foster more equitable outcomes in solar deployment both at a local and global scale.

In one embodiment the SERECDG provides frameworks for the inclusion of the social value to distributed energy resources to then be applied and piloted with local and regional partners within the Allegheny region. The application of our Social RECS™ will reduce energy costs, create workforce training and learning opportunities, and provide opportunities for extra power redundancy for schools, hospitals, affordable housing, municipalities, and other important community serving institutions.

SERECDG seeks to introduce equity into global renewable energy markets with the market innovation of Social Renewable Energy Credits. With Social RECs, we develop solar projects using blockchain and impact capital in low income communities.

Working with national and international REC brokerages, SERECDG identified a unique niche, and begin to self-develop 1MW of solar located in the birthplace of Martin Luther King jr, and the late Civil Rights champion John Lewis's 5th district.

Energy Attributes that Increase Equity in Renewable Energy Development

Making renewable energy economically viable is a challenge for a wide variety of stakeholders. Small projects lack the scale to attract financing. Policy restrictions on renewable energy in many markets prohibit achieving significant scale. Energy rates in several markets make it difficult for projects to produce an attractive return on investment without an additional revenue stream. Corporations are purchasing renewable energy credits (RECs), yet oftentimes RECs lack local, tangible, marketable, community centered and impact. The most adversely affected by these market limitations are consumers and communities who have been historically excluded, including but not limited to communities of color, and low and moderate income communities.

Social/Equity/Impact Renewable Energy Credits create an additional revenue stream to aid in the more equitable development of renewable energy. This unique energy attribute product is procured from sites serving the public good, and is priced to reflect multiple value propositions including marketing, societal, and environmental value. Our product helps market players create more tangible and marketable value when procuring energy attributes to accomplish multiple goals including but not limited to: carbon reduction, community engagement, marketing and public relations, corporate social responsibility, Environmental, Social, and Governance, diversity, equity and inclusion, restorative justice, and stakeholder engagement goals.

Social/Equity/Impact Renewable Energy Credits (RECs) are a new energy attribute product that allows for 1) better economics for renewable projects serving the public good 2) More tangible, visible marketing value for buyers of energy attributes. 4) More opportunities for community impact for all stakeholders 3) More access to clean energy for historically excluded communities, and those traditionally without choice or access.

Renewable Energy Credits are currently and historically procured only from large utility scale renewables and include no appropriate provisions for community impact or the different economics of on-site solar development.

The market for energy attributes is typically focused on larger scale renewable developments and does not include direct social and/or community impact.

Traditional energy attributes do not account for the equitable development of renewable assets.

Social/Equity/Impact Renewable Energy Credits are a unique energy attribute product produced by the generation of renewable energy that serves the public good, directly impacts and enhances value for historically excluded communities, and incorporates multiple value propositions such as community impact and marketing value. Social RECs are especially beneficial to distributed generation renewable energy applications where the on-site, local nature of the renewable power generation can offer enhanced equity opportunities such as enhanced resiliency, workforce training opportunities, experiential learning, and participation in smart-grid and demand-side energy programs.

Our unique stakeholder engagement and procurement process to produce a Social/Equity REC vets renewable energy sites stakeholder and communities for eligibility based on several points of impact data, aggregates project sites to provide provides the adequate scale, facilitates the procurement, and often times provides a important financing component for deployment of the renewable technology. This unique process produces the market innovation that is a Social/Equity Renewable Energy Credit.

1) Recruit and vet renewable development sites serving the public good
2) Evaluate project economics, development teams, community impact data including but not limited to energy burden, historical context, demographics, and Environmental, Social, and Governance metrics, marketing value, and qualitative and quantitative data.
3) Aggregate sites into a scalable portfolio with social and project data to yield appropriate Social REC pricing for all stakeholders, including community groups, development teams, and power off-takers.
4) Work with various energy attribute purchasers to include Social/Equity/Impact RECs within their carbon reduction portfolio, marketing and PR strategy, and Environmental, Social, and Governance goals. Execute off-taker agreements, utilize existing REC registries to buyer specifications.
5) Use revenue from Social/Equity/Impact RECs to
    5.1. TIER One: Develop and sustain renewable projects serving historically excluded communities typically impeded from development without this additional revenue stream
    5.2. TIER TWO: Fund economic inclusion and community resilience activities such as workforce training, STEAM education tools, storage-ready capabilities, energy efficiency and weatherization,
    5.3. TIER THREE: Restorative Justice. Utilize Social REC revenue to reduce energy burden and foster restorative economic development and enhancement for historically excluded communities.
6) Coordinate marketing and PR functions, community and stakeholder engagement and tracking of impact KIPs (Key performance indicators) for community use as well as CSR reporting The recruitment and qualifying of applicable renewable generation sources serving historically excluded communities is key to determining the eligibility of a Social/Equity/Impact REC and obtaining the scale to attract buyers. (steps 1-4) The revenue generated by Social/Equity/Impact RECs is factored into project economics to help development, and economic empowerment. (step 5) The application and marketing of the product and benefits is part of the value to the off-taker. (step 6)

1) Without Qualified Social and Renewable Impact (QSRI) sites there are no opportunities for renewable generation to produce the MW/hrs (megawatt hours) needed to produce a Social/Equity REC, nor is there the baseline impact data to track impact KPIs.
2) Without the additional revenue component of Social RECs, financing component these QSRI sites typically lack the financial resources to be developed
3) QSRI sites individually are challenged to produce the scale needed for a typical REC buyer or the financier in step 2, and thus an aggregated portfolio of multiple sites is key to scaling more equitable renewable development.
4) As the social/equity REC is a unique product, separate from anything currently on the market, special relationships, impact and community statistics and qualitative data is needed for the pricing, marketing, and sale of these energy attributes
5) The sale of the social/equity RECs provides the additional revenue to make the QSRI energy project economically viable for all stakeholders including the community, the t site of the renewable asset, the financiers, and the social/equity REC purchaser.
6) To deliver on the community impact ethos of social/equity RECs, the Solar Stewards Program facilitates additional community impact partnerships central to the QSRI renewable energy project
7) Operations and maintenance of the QSRI project is imperative in honoring social/equity REC off-taker agreements and power purchase agreements, and community benefit agreements
8) Monitoring and qualifying the community and environmental impacts is important to furthering the adoption of both environmental AND community impact inherent in the Social/Equity Renewable Energy Credit product If we vet and obtain enough renewable generation directly serving the public good than this aggregate is more attractive for funding and a Social/Equity/Impact Renewable Energy Credit off-taker. If we can include the additional values of community impact, marketing, and visibility of the QSRI renewable energy source, Social/Equity/Impact RECs can be priced to make the project economically viable and socially beneficial, where it typically may not otherwise be for all stakeholders.

By following the above listed steps, a unique energy attribute is created which lends more equity to renewable energy development.

The mechanisms disclosed herein may include of the above listed elements

This specifically mechanism generating a market rate IRR (internal rate of return) for the investors and a beneficial PPA (power purchase agreement) rate for the QSRI renewable site as well as sufficient proceeds for development and legal costs.

The Solar Stewards Program is a vertically integrated business process that facilitates all aspects of this interlinked value chain to bring the unique Social/Equity REC product to market, which in turn creates a competitive advantage in the development of renewable projects that serve historically excluded communities.

Social/Equity Renewable Energy Credits (Social RECS) allow for more equitable renewable energy development by providing an additional income stream to make renewable energy applications benefiting the public good economically viable to all stakeholders.

Through the Solar Stewards Program, we obtain, and vet portfolios of QSRI sites to reach enough scale for more economic financing opportunities, as well as create enough volume for the typical energy attribute purchaser/offtaker. Because of the direct social and environmental impact of providing on-site distributed generation renewables to historically excluded and with our qualitative impact metrics, we can command a price for our Social/Equity RECs that generates enough internal rate of return (IRR) to satisfy renewable assets investors, and financiers. including Power Purchase Agreements (PPA) that offer the community significant savings on their electricity spend. To fulfill the Social/Equity Impact inherent in a Social/Equity Renewable Energy Credit, the Solar Stewards Program also facilitates various workforce development, advocacy, and STEAM programs utilizing the distributed generation on-site renewable technology.

1) Locate and QSRI projects serving historically excluded communities This could look like 20 individual schools, or 10 affordable housing buildings, for example. Vetting includes qualifying impact use case (population), obtaining impact data such as energy burden, historically redlined HUD Zone etc, (location-see scoping doc for inputs) 2) Partner with mission aligned solar financing providers, including green banks, impact investors, tax equity investors, solar lessors, offering accessible financing with competitive rates and flexible terms. This could look like LMI (low-moderate income developers employing leasing models to those with low to mid credit scores, or green banks offering low cost financing.

3) Input impact metrics, including QSRI site user demographics, income levels and other intrinsic values used to determine the dynamic pricing for the "Social/Equity REC product.

4) Source and Educate the energy attribute buyer for Social/Equity RECs though key relationships and market and sell them on the best price/term for all stakeholders in the Solar Stewards Program. These general stakeholders include: 1) The site where the QSRI renewables are located. 2) The community that uses the QSRI 3) The financier providing capital to deploy the QSRI assets are located 4) The Social REC purchaser 5) Execute all Social REC Off-taker agreements and manage the development of the QSRI 6) Monitor operations to ensure they are in compliance with the Social/Equity REC offtaker agreement, 7) Deliver on the additional impact inherent in the Social/Equity REC product via the Solar Stewards Program by supporting community partners' impact programs using the QSRI renewable as a training/learning tool, as well as public relations and advocacy.

One element, is the ability to create a unique energy attribute, (entitled Social/Equity/Impact Renewable Energy Credits) from QSRI renewable energy generation projects that serve the public good, and price this product to include all value propositions as described for the benefit of all stakeholders.

that are sourced primarily from distributed generation renewables located on site, create a direct community impact, and command a unique price because of these additional values, where traditional RECs do not. This added value creates the unique pricing that enables the Solar Stewards program to develop more economically viable QSRI projects. It's a virtuous cycle and a fully integrated process.

Similar claims to the community impact and subsequent value of RECs generated from renewable sources located near, on, or serving the public good could enter the market, however without steps mentioned herein to ensure legitimacy and tangible impact throughout the value chain that constitutes the Social/Equity/Impact REC product, there is the potential for misuse and "social-washing."

Renewable energy developers can utilize Social/Equity/Impact renewable energy credits to realize additional project revenue on projects serving the public good.

Renewable energy producers can realize a new revenue stream and/or benefit from better project economics and savings on energy expenditures.

Our Social/Equity/Impact REC purchasers/off-takers realize both an environmental goal in the form of carbon reduction, as well as community impact and marketing/PR opportunities.

Tax Equity investors get all affiliated tax credits with the QSRI array, impact investors receive a competitive return.

Residents of the community in which the DG site is based are provided with workforce development resources, STEAM learning tools etc.

The Social/Equity/Impact Renewable Energy Credit Product can also be utilized within a blockchain framework that will allow for a streamlining/automation of the authentication of the Social/Equity/Impact REC product.

The inclusion of both qualitative and quantitative data to price an attribute to include and produce more equitable outcomes can apply to data, machine learning, water and mineral rights, and all sustainability measures.

The Social/Equity/Impact Renewable Energy Credit Product can also be utilized within a blockchain framework that will allow for a streamlining/automation of the authentication of the Social/Equity/Impact REC product. As blockchain advances in this application, it will make off-grid and international DG sites eligible for purchase. This added revenue will facilitate the development of more DG renewables, ie: Solar Stewards process.

The business method and process of the Solar Stewards Program creates the opportunity for the scaling, and financing of QSRI renewable applications, including distributed generation (DG) renewables combined with community impact to yield a unique social impact product in the energy attribute space. The same could be applied to Carbon Offsets and other future energy and environmental attribute frameworks.

Environmental attributes are any and all claims, credits, benefits, emissions reductions, offsets, and allowances, howsoever entitled, resulting from the avoidance of the emission of any gas, chemical or other substance to the air, soil or water.

A Renewable energy credit typically indicates one megawatt-hour of electricity was generated and fed into the grid from an eligible renewable source.

SERECDG

FIG. 1 shows a datagraph illustrating data flow(s) for the SERECDG.

FIG. 2 shows non-limiting, example embodiments of a datagraph illustrating data flow(s) for the SERECDG.

Additional Alternative Embodiment Examples

The following alternative example embodiments provide a number of variations of some of the already discussed principles for expanded color on the abilities of the SERECDG.

Additional embodiments may include:

1. A energy social equity allocation apparatus, comprising:
   at least one memory;
   a component collection in the at least one memory;
   at least one processor disposed in communication with the at least one memory and configured to issue a plurality of processor-executable instructions from the component collection, the processor-executable instructions configured to:
   obtain, via the at least one processor, an energy equity participation request datastructure for the benefit of an underserved community, including: a community identifier, a geographical region, an energy type, an energy source identifier, an energy output, an energy consumption, annual energy credit production, energy credit account identifier, a community population, a community population growth rate, a gross income for the community population;

obtain a climate steward site datastructure from an energy production site, including: a climate steward identifier, a geographical region, an energy type, an energy source identifier, an energy output, an energy consumption, annual energy credit production, energy credit account identifier, a community population, a community population growth rate, a gross income for the community population;

obtain a climate steward request datastructure from an energy production site, including: an energy credit donation value;

obtain a transfer of the energy credit donation value based the climate steward identifier and the energy credit donation value;

determine community apportionment values for community identifiers based on collected energy credit donation values and energy equity participation request;

provide community apportionment values to requesting communities' energy credit account identifier accounts based on their community identifier.

2. The apparatus of embodiment 1, including instructions further comprising:
energy credit types including: solar credits, wind credits, nuclear credits, wave energy credits, carbon credits.

3. A energy social equity allocation processor-readable, non-transient medium, comprising processor-executable instructions configured to:

obtain, via the at least one processor, an energy equity participation request datastructure for the benefit of an underserved community, including: a community identifier, a geographical region, an energy type, an energy source identifier, an energy output, an energy consumption, annual energy credit production, energy credit account identifier, a community population, a community population growth rate, a gross income for the community population;

obtain a climate steward site datastructure from an energy production site, including: a climate steward identifier, a geographical region, an energy type, an energy source identifier, an energy output, an energy consumption, annual energy credit production, energy credit account identifier, a community population, a community population growth rate, a gross income for the community population;

obtain a climate steward request datastructure from an energy production site, including: an energy credit donation value;

obtain a transfer of the energy credit donation value based the climate steward identifier and the energy credit donation value;

determine community apportionment values for community identifiers based on collected energy credit donation values and energy equity participation request;

provide community apportionment values to requesting communities' energy credit account identifier accounts based on their community identifier.

4. The medium of embodiment 3, including instructions further comprising:
energy credit types including: solar credits, wind credits, nuclear credits, wave energy credits, carbon credits.

5. A energy social equity allocation processor-implemented system, comprising:
means to process processor-executable instructions;
means to issue processor-issuable instructions from a processor-executable component collection via the means to process processor-executable instructions, the processor-issuable instructions configured to:

obtain, via the at least one processor, an energy equity participation request datastructure for the benefit of an underserved community, including: a community identifier, a geographical region, an energy type, an energy source identifier, an energy output, an energy consumption, annual energy credit production, energy credit account identifier, a community population, a community population growth rate, a gross income for the community population;

obtain a climate steward site datastructure from an energy production site, including: a climate steward identifier, a geographical region, an energy type, an energy source identifier, an energy output, an energy consumption, annual energy credit production, energy credit account identifier, a community population, a community population growth rate, a gross income for the community population;

obtain a climate steward request datastructure from an energy production site, including: an energy credit donation value;

obtain a transfer of the energy credit donation value based the climate steward identifier and the energy credit donation value;

determine community apportionment values for community identifiers based on collected energy credit donation values and energy equity participation request;

provide community apportionment values to requesting communities' energy credit account identifier accounts based on their community identifier.

6. The system of embodiment 5, including instructions further comprising:
energy credit types including: solar credits, wind credits, nuclear credits, wave energy credits, carbon credits.

7. A energy social equity allocation processor-implemented process, comprising executing processor-executable instructions to:

obtain, via the at least one processor, an energy equity participation request datastructure for the benefit of an underserved community, including: a community identifier, a geographical region, an energy type, an energy source identifier, an energy output, an energy consumption, annual energy credit production, energy credit account identifier, a community population, a community population growth rate, a gross income for the community population;

obtain a climate steward site datastructure from an energy production site, including: a climate steward identifier, a geographical region, an energy type, an energy source identifier, an energy output, an energy consumption, annual energy credit production, energy credit account identifier, a community population, a community population growth rate, a gross income for the community population;

obtain a climate steward request datastructure from an energy production site, including: an energy credit donation value;

obtain a transfer of the energy credit donation value based the climate steward identifier and the energy credit donation value;

determine community apportionment values for community identifiers based on collected energy credit donation values and energy equity participation request;
provide community apportionment values to requesting communities' energy credit account identifier accounts based on their community identifier.

8. The process of embodiment 7, including instructions further comprising:
energy credit types including: solar credits, wind credits, nuclear credits, wave energy credits, carbon credits.

SERECDG Controller

FIG. 3 shows a block diagram illustrating embodiments of a SERECDG controller. In this embodiment, the SERECDG controller 301 may serve to aggregate, process, store, search, serve, identify, instruct, generate, match, and/or facilitate interactions with a computer through environmental clean energy technologies, and/or other related data.

Users, which may be people and/or other systems, may engage information technology systems (e.g., computers) to facilitate information processing. In turn, computers employ processors to process information; such processors 303 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 329 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the SERECDG controller 301 may be connected to and/or communicate with entities such as, but not limited to: one or more users from peripheral devices 312 (e.g., user input devices 311); an optional cryptographic processor device 328; and/or a communications network 313.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The SERECDG controller 301 may be based on computer systems that may comprise, but are not limited to, components such as: a computer systemization 302 connected to memory 329.

Computer Systemization

A computer systemization 302 may comprise a clock 330, central processing unit ("CPU(s)" and/or "processor(s)" (these terms are used interchangeably throughout the disclosure unless noted to the contrary)) 303, a memory 329 (e.g., a read only memory (ROM) 306, a random access memory (RAM) 305, etc.), and/or an interface bus 307, and most frequently, although not necessarily, are all interconnected and/or communicating through a system bus 304 on one or more (mother) board(s) 302 having conductive and/or otherwise transportive circuit pathways through which instructions (e.g., binary encoded signals) may travel to effectuate communications, operations, storage, etc. The computer systemization may be connected to a power source 386; e.g., optionally the power source may be internal. Optionally, a cryptographic processor 326 may be connected to the system bus. In another embodiment, the cryptographic processor, transceivers (e.g., ICs) 374, and/or sensor array (e.g., accelerometer, altimeter, ambient light, barometer, global positioning system (GPS) (thereby allowing SERECDG controller to determine its location), gyroscope, magnetometer, pedometer, proximity, ultra-violet sensor, etc.) 373 may be connected as either internal and/or external peripheral devices 312 via the interface bus I/O 308 (not pictured) and/or directly via the interface bus 307. In turn, the transceivers may be connected to antenna(s) 375, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n (also known as WiFi in numerous iterations), Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., headsets (e.g., Apple AirPods (Pro)®, glasses, goggles (e.g., Google Glass®), watches, etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 329 beyond the processor itself; internal memory may include, but is not limited to: fast registers, various levels of cache memory (e.g., level 1, 2, 3, etc.), (dynamic/static) RAM, solid state memory, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's DragonBall® and PowerPC®; IBM's® and Sony's® Cell processor; Intel's® 80X86 series (e.g., 80386, 80486), Pentium®, Celeron®, Core (2) Duo®, i series (e.g., i3, i5, i7, i9, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code), e.g., via load/read address commands; e.g., the CPU may read processor issuable instructions from memory (e.g., reading it from a component collection (e.g., an interpreted and/or compiled program application/library including allowing the processor to execute instructions from the application/library) stored in the memory). Such instruction passing facilitates communication within the SERECDG controller and beyond through various interfaces. Should processing requirements dictate a greater amount speed and/or capacity, distributed processors (e.g., see Distributed SERECDG below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the SERECDG may be achieved by implementing a microcontroller such as CAST's® R8051XC2 microcontroller; Intel's® MCS 51 (i.e., 8051 microcontroller); and/or the like. Also, to implement certain features of the SERECDG, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the SERECDG component collection (distributed or otherwise) and/or features may be implemented via the microprocessor and/or via embedded components; e.g., via ASIC, coprocessor, DSP, FPGA, and/or the like. Alternately, some implementations of the SERECDG may be implemented with embedded components that are configured and used to achieve a variety of features or signal processing.

Depending on the particular implementation, the embedded components may include software solutions, hardware solutions, and/or some combination of both hardware/software solutions. For example, SERECDG features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the SERECDG features. A hierarchy of programmable interconnects allow logic blocks to be interconnected as needed by the SERECDG system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the SERECDG may be developed on FPGAs and then migrated into a fixed version that more resembles ASIC implementations. Alternate or coordinating implementations may migrate SERECDG controller features to a final ASIC instead of or in addition to FPGAs. Depending on the implementation all of the aforementioned embedded components and microprocessors may be considered the "CPU" and/or "processor" for the SERECDG.

Power Source

The power source 386 may be of any various form for powering small electronic circuit board devices such as the following power cells: alkaline, lithium hydride, lithium ion, lithium polymer, nickel cadmium, solar cells, and/or the like. Other types of AC or DC power sources may be used as well.

In the case of solar cells, in one embodiment, the case provides an aperture through which the solar cell may capture photonic energy. The power cell 386 is connected to at least one of the interconnected subsequent components of the SERECDG thereby providing an electric current to all subsequent components. In one example, the power source 386 is connected to the system bus component 304. In an alternative embodiment, an outside power source 386 is provided through a connection across the I/O 308 interface. For example, Ethernet (with power on Ethernet), IEEE 1394, USB and/or the like connections carry both data and power across the connection and is therefore a suitable source of power.

Interface Adapters

Interface bus (ses) 307 may accept, connect, and/or communicate to a number of interface adapters, variously although not necessarily in the form of adapter cards, such as but not limited to: input output interfaces (I/O) 308, storage interfaces 309, network interfaces 310, and/or the like. Optionally, cryptographic processor interfaces 327 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E) ISA), Micro Channel Architecture (MCA), NuBus, Peripheral Component Interconnect (Extended) (PCI (X)), PCI Express, Personal Computer Memory Card International Association (PCMCIA), and/or the like.

Storage interfaces 309 may accept, communicate, and/or connect to a number of storage devices such as, but not limited to: (removable) storage devices 314, removable disc devices, and/or the like. Storage interfaces may employ connection protocols such as, but not limited to: (Ultra) (Serial) Advanced Technology Attachment (Packet Interface) ((Ultra) (Serial) ATA (PI)), (Enhanced) Integrated Drive Electronics ((E) IDE), Institute of Electrical and Electronics Engineers (IEEE) 1394, fiber channel, Non-Volatile Memory (NVM) Express (NVMe), Small Computer Systems Interface (SCSI), Thunderbolt, Universal Serial Bus (USB), and/or the like.

Network interfaces 310 may accept, communicate, and/or connect to a communications network 313. Through a communications network 313, the SERECDG controller is accessible through remote clients 333b (e.g., computers with web browsers) by users 333a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed SERECDG below), architectures may similarly be employed to pool, load balance, and/or otherwise decrease/increase the communicative bandwidth required by the SERECDG controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 310 may be used to engage with various communications network types 313. For example, multiple network interfaces may be employed to allow for the communication over broadcast, multicast, and/or unicast networks.

Input Output interfaces (I/O) 308 may accept, communicate, and/or connect to user, peripheral devices 312 (e.g., input devices 311), cryptographic processor devices 328, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, Thunderbolt/USB-C, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT), Liquid Crystal Display (LCD), Light-Emitting Diode (LED), Organic Light-Emitting Diode (OLED), and/or the like based monitor with an interface (e.g., HDMI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 312 may be connected and/or communicate to I/O and/or other facilities of the like such as network interfaces, storage interfaces, directly to the interface bus, system bus, the CPU, and/or the like. Peripheral devices may be external, internal and/or part of the SERECDG controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection ensuring secure transactions with a digital signature, as connection/format adaptors, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 311 often are a type of peripheral device 512 (see above) and may include: accelerometers, cameras, card readers, dongles, finger print readers, gloves, graphics tablets, joysticks, keyboards, microphones, mouse (mice), remote controls, security/biometric devices (e.g., facial identifiers, fingerprint reader, iris reader, retina reader, etc.), styluses, touch screens (e.g., capacitive, resistive, etc.), trackballs, trackpads, watches, and/or the like.

It should be noted that although user input devices and peripheral devices may be employed, the SERECDG controller may be embodied as an embedded, dedicated, and/or monitor-less (i.e., headless) device, and access may be provided over a network interface connection.

Cryptographic units such as, but not limited to, microcontrollers, processors 326, interfaces 327, and/or devices 328 may be attached, and/or communicate with the SERECDG controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+MB/s of cryptographic instructions; VLSI Technology's® 33 MHz 6868; and/or the like.

Memory

Generally, any mechanization and/or embodiment allowing a processor to affect the storage and/or retrieval of information is regarded as memory 329. The storing of information in memory may result in a physical alteration of the memory to have a different physical state that makes the memory a structure with a unique encoding of the memory stored therein. Often, memory is a fungible technology and resource, thus, any number of memory embodiments may be employed in lieu of or in concert with one another. It is to be understood that the SERECDG controller and/or a computer systemization may employ various forms of memory 329. For example, a computer systemization may be configured to have the operation of on-chip CPU memory (e.g., registers), RAM, ROM, and any other storage devices performed by a paper punch tape or paper punch card mechanism; however, such an embodiment would result in an extremely slow rate of operation. In one configuration, memory 329 will include ROM 306, RAM 305, and a storage device 314. A storage device 314 may be any various computer system storage. Storage devices may include: an array of devices (e.g., Redundant Array of Independent Disks (RAID)); a cache memory, a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; register memory (e.g., in a CPU), solid state memory devices (USB memory, solid state drives (SSD), etc.); other processor-readable storage mediums; and/or other devices of the like. Thus, a computer systemization generally employs and makes use of memory.

Component Collection

The memory 329 may contain a collection of application/library/program and/or database components and/or data such as, but not limited to: operating system component(s) 315 (operating system); information server component(s) 316 (information server); user interface component(s) 317 (user interface); Web browser component(s) 318 (Web browser); database(s) 319; mail server component(s) 321; mail client component(s) 322; cryptographic server component(s) 320 (cryptographic server); the SERECDG component(s) 335 (e.g., which may include Climate Steward Collector, Community Collector, Allocation Engine 341-343, and/or the like components); and/or the like (i.e., collectively a component collection). These components may be stored and accessed from the storage devices and/or from storage devices accessible through an interface bus. Although unconventional program components such as those in the component collection may be stored in a local storage device 314, they may also be loaded and/or stored in memory such as: cache, peripheral devices, processor registers, RAM, remote storage facilities through a communications network, ROM, various forms of memory, and/or the like.

Operating System

The operating system component 315 is an executable program component facilitating the operation of the SERECDG controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® Jul. 8, 2010; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millennium/Mobile/NT/Vista/XP/7/X (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may facilitate the interaction with communications networks, data, I/O, peripheral devices, program components, memory, user input devices, and/or the like. The operating system may provide communications protocols that allow the SERECDG controller to communicate with other entities through a communications network 313. Various communication protocols may be used by the SERECDG controller as a subcarrier transport mechanism for interaction, such as, but not limited to: multicast, TCP/IP, UDP, unicast, and/or the like.

Information Server

An information server component 316 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, Ruby, wireless application protocol (WAP), WebObjects®, and/or the like. The information server may support secure communications protocols such as, but not limited to, File Transfer Protocol (FTP(S)); HyperText Transfer Protocol (HTTP); Secure Hypertext Transfer Protocol (HTTPS), Secure Socket Layer (SSL) Transport Layer Security (TLS), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), Slack®, open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like). The information server may provide results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the SERECDG controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the SERECDG database 319, operating systems, other program components, user interfaces, Web browsers, and/or the like.

Access to the SERECDG database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the SERECDG. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, and the resulting command is provided over the bridge mechanism to the SERECDG as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, graphical views, menus, scrollers, text fields, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other webbrowser/cloud based client OSs); Microsoft's Windows® 2000/2003/3.1/95/98/CE/Millennium/Mobile/NT/Vista/XP/7/X (Server)® (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D) HTML, FLASH, Java, JavaScript, etc. interface libraries such as, but not limited to, Dojo, jQuery (UI), MooTools, Prototype, script.aculo.us, SWFObject, Yahoo! User Interface®, and/or the like, any of which may be used and) provide a baseline and mechanism of accessing and displaying information graphically to users.

A user interface component 317 is a stored program component that is executed by a CPU. The user interface may be a graphic user interface as provided by, with, and/or atop operating systems and/or operating environments, and may provide executable library APIs (as may operating systems and the numerous other components noted in the component collection) that allow instruction calls to generate user interface elements such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 318 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D) HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the SERECDG enabled nodes. The combined application may be nugatory on systems employing Web browsers.

Mail Server

A mail server component 321 is a stored program component that is executed by a CPU 303. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or.NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the SERECDG. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the SERECDG mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 322 is a stored program component that is executed by a CPU 303. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 320 is a stored program component that is executed by a CPU 303, cryptographic processor 326, cryptographic processor interface 327, cryptographic processor device 328, and/or the like. Cryptographic processor interfaces will allow for expedition of encryption and/or decryption requests by the cryptographic component; however, the cryptographic component, alternatively, may run on a CPU and/or GPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component facilitates numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the SERECDG may encrypt all incoming and/or outgoing communications and may serve as node within a virtual private network (VPN) with a wider communications network. The cryptographic component facilitates the process of "security authorization" whereby access to a resource is inhibited by a security protocol and the cryptographic component effects authorized access to the secured resource. In addition, the cryptographic component may provide unique identifiers of content, e.g., employing an MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to allow the SERECDG component to engage in secure transactions if so desired. The cryptographic component facilitates the secure accessing of resources on the SERECDG and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The SERECDG Database

The SERECDG database component 319 may be embodied in a database and its stored data. The database is a stored program component, which is executed by the CPU; the stored program component portion configuring the CPU to process the stored data. The database may be a fault tolerant, relational, scalable, secure database such as Claris FileMaker®, MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases include a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the SERECDG database may be implemented using various other data-structures, such as an array, hash, (linked) list, struct, structured text file (e.g., XML), table, flat file database, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the SERECDG database is implemented as a data-structure, the use of the SERECDG database 319 may be integrated into another component such as the SERECDG component 335. Also, the database may be implemented as a mix of data structures, objects, programs, relational structures, scripts, and/or the like. Databases may be consolidated and/or distributed in countless variations (e.g., see Distributed SERECDG below). Portions of databases, e.g., tables, may be exported and/or imported and thus decentralized and/or integrated.

In one embodiment, the database component 319 includes several tables representative of the schema, tables, structures, keys, entities and relationships of the described database 319a-z:

An accounts table 319a includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 319b includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a SERECDG);

An devices table 319c includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 319d includes fields such as, but not limited to: appID, appName, appType, app Dependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 319e includes fields such as, but not limited to: assetID, accountID, userID, distributor AccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, asset Price, asset Value, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 319f includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 319g includes fields such as, but not limited to: transactionID, accountID, assetIDs, deviceIDs, paymentIDs, transactionIDs, userID, merchantID, transactionType, transactionDate, transactionTime, transaction Amount, transactionQuantity, transactionDetails, productsList, product Type, productTitle, productsSummary, productParamsList, transactionNo, transaction AccessPrivileges, transactionPreferences, transactionRestrictions, merchantAuthKey, merchantAuthCode, and/or the like;

An merchants table 319h includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 319i includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisher Address, publisherURL, publisherTag, publisherIndustry, publisherName, publisherDescription, siteDomain, siteURL, siteContent, siteTag, siteContext, siteImpression, siteVisits, siteHeadline, sitePage, site AdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

A market_data table 319z includes fields such as, but not limited to: market_data_feed_ID, asset_ID, asset_symbol, asset_name, spot_price, bid_price, ask_price, and/or the like; in embodiment, the market data table is populated through a market data feed (e.g., Bloomberg's PhatPipe®, Consolidated Quote System® (CQS), Consolidated Tape Association® (CTA), Consolidated Tape System® (CTS), Dun & Bradstreet®, OTC Montage Data Feed® (OMDF), Reuter's Tib®, Triarch®, US equity trade and quote market data®, Unlisted Trading Privileges® (UTP) Trade Data Feed® (UTDF), UTP Quotation Data Feed® (UQDF), and/or the like feeds, e.g., via ITC 2.1 and/or respective feed protocols), for example, through Microsoft's® Active Template Library and Dealing Object Technology's real-time toolkit Rtt.Multi.

In one embodiment, the SERECDG database may interact with other database systems. For example, employing a distributed database system, queries and data access by search SERECDG component may treat the combination of the SERECDG database, an integrated data security layer database as a single database entity (e.g., see Distributed SERECDG below).

In one embodiment, user programs may contain various user interface primitives, which may serve to update the SERECDG. Also, various accounts may require custom database tables depending upon the environments and the types of clients the SERECDG may need to serve. It should be noted that any unique fields may be designated as a key field throughout. In an alternative embodiment, these tables have been decentralized into their own databases and their respective database controllers (i.e., individual database controllers for each of the above tables). The SERECDG may also be configured to distribute the databases over several computer systemizations and/or storage devices. Similarly, configurations of the decentralized database controllers may be varied by consolidating and/or distributing the various database components 319a-z. The SERECDG may be configured to keep track of various settings, inputs, and parameters via database controllers.

The SERECDG database may communicate to and/or with other components in a component collection, including itself, and/or facilities of the like. Most frequently, the SERECDG database communicates with the SERECDG component, other program components, and/or the like. The database may contain, retain, and provide information regarding other nodes and data.

The SERECDGs

The SERECDG component 335 is a stored program component that is executed by a CPU via stored instruction code configured to engage signals across conductive pathways of the CPU and ISICI controller components. In one embodiment, the SERECDG component incorporates any and/or all combinations of the aspects of the SERECDG that were discussed in the previous figures. As such, the SERECDG affects accessing, obtaining and the provision of information, services, transactions, and/or the like across various communications networks. The features and embodiments of the SERECDG discussed herein increase network efficiency by reducing data transfer requirements with the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the SERECDG's features and facilities, and in many cases reduce the costs, energy consumption/requirements, and extend the life of SERECDG's underlying infrastructure; this has the added benefit of making the SERECDG more reliable. Similarly, many of the features and mechanisms are designed to be easier for users to use and access, thereby broadening the audience that may enjoy/employ and exploit the feature sets of the SERECDG; such ease of use also helps to increase the reliability of the SERECDG. In addition, the feature sets include heightened security as noted via the Cryptographic components 320, 326, 328 and throughout, making access to the features and data more reliable and secure The SERECDG transforms inputs, via SERECDG components (e.g., Climate Steward Collector, Community Collector, Allocation Engine), into community apportionment values outputs.

The SERECDG component facilitates access of information between nodes may be developed by employing various development tools and languages such as, but not limited to: Apache® components, Assembly, ActiveX, binary executables, (ANSI) (Objective-) C (+), C# and/or .NET, database adapters, CGI scripts, Java, JavaScript, mapping tools, procedural and object oriented development tools, PERL, PHP, Python, Ruby, shell scripts, SQL commands, web application server extensions, web development environments and libraries (e.g., Microsoft's® ActiveX; Adobe® AIR, FLEX & FLASH; AJAX; (D) HTML; Dojo, Java; JavaScript; jQuery (UI); MooTools; Prototype; script.aculo.us; Simple Object Access Protocol (SOAP); SWFObject; Yahoo!® User Interface; and/or the like), WebObjects®, and/or the like. In one embodiment, the SERECDG server employs a cryptographic server to encrypt and decrypt communications. The SERECDG component may communicate to and/or with other components in a component collection, including itself, and/or facilities of the like. Most frequently, the SERECDG component communicates with the SERECDG database, operating systems, other program components, and/or the like. The SERECDG may contain, communicate, generate, obtain, and/or provide program component, system, user, and/or data communications, requests, and/or responses.

Distributed SERECDGs

The structure and/or operation of any of the SERECDG node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such, a combination of hardware may be distributed within a location, within a region and/or globally where logical access to a controller may be abstracted as a singular node, yet where a multitude of private, semiprivate and publicly accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access, etc.).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so as discussed through the disclosure and/or through various other data processing communication techniques.

The configuration of the SERECDG controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for SERECDG controller and/or SERECDG component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D) COM), (Distributed) Object Linking and Embedding ((D) OLE), and/or the like), Common Object Request Broker Architecture (CORBA), Jini local and remote application program interfaces, JavaScript Object Notation (JSON), NeXT Computer, Inc.'s (Dynamic) Object Linking, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as JSON, lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the SERECDG controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via an SSL connection, parse the data to extract variables, and store the data to a database, is provided below:

```
<?PHP
header('Content-Type: text/plain');
// set ip address and port to listen to for incoming data
$address='192.168.0.100';
$port=255;
//create a server-side SSL socket, listen for/accept incoming communication
$sock=socket_create(AF_INET, SOCK_STREAM, 0);
socket_bind($sock, $address, $port) or die ('Could not bind to address');
socket_listen($sock);
$client=socket_accept($sock);
//read input data from client device in 1024 byte blocks until end of message
do {
    $input=" ";
    $input=socket_read($client, 1024);
    $data.=$input;
} while($input!=" ");
// parse data to extract variables
$obj=json_decode($data, true);
// store input data in a database
mysql_connect("201.408.185.132", $DBserver, $password); //access database server
mysql_select("CLIENT_DB.SQL"); //select database to append
mysql_query("INSERT INTO UserTable (transmission) VALUES ($data)"); //add data to UserTable table in a CLIENT database
mysql_close("CLIENT_DB.SQL"); //close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.d oc/referenceguide295.htm and other parser implementations:

http://publib.boulder.ibm.com/infocenter/tivihelp/v2r1/index.jsp?topic=/com.ibm.IBMDI.d oc/referenceguide259.htm all of which are hereby expressly incorporated by reference.

In order to address various issues and advance the art, the entirety of this application for Social Equity Renewable Energy Credit Datastructures and Distributed Generation Engine Apparatuses, Processes and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivatives thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", etc. may refer to a relationship where structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, provisionals, re-issues, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a SERECDG individual and/or enterprise user, database configuration and/or relational model, data type, data transmission and/or network framework, library, syntax structure, and/or the like, various embodiments of the SERECDG, may be implemented that allow a great deal of flexibility and customization. For example, aspects of the SERECDG may be adapted for charities, accounting systems, inventory systems, etc. While various embodiments and discussions of the SERECDG have included environmental clean energy, however, it is to be understood that the embodiments described herein may be readily configured and/or customized for a wide variety of other applications and/or implementations.

What is claimed is:

1. An energy allocation apparatus, comprising:
   at least one memory with a component collection stored in the at least one memory, wherein the memory has a hierarchy of programmable interconnects that allow logic blocks to be interconnected as needed;
   at least one processor disposed in communication with the at least one memory and configured to issue a plurality of processor-executable instructions from the component collection, the processor-executable instructions configured to:
      obtain, via the at least one processor, a participation request data structure for a predetermined location based on a plurality of parameters;
      obtain a first data structure based on a plurality of identifiers from at least two of a plurality of production sites that generate renewable electrical;
      obtain a second data structure from the least two of the plurality of production sites, wherein the second data structure comprises a data value, including a renewable energy credit; and
      obtain a transfer of the data value based on at least one identifier of the plurality of identifiers and the participation request data;
   a mathematical model configured to calculate a plurality of apportionment values for each identifier of the plurality of identifiers, wherein the mathematical model is a multiple regression model with independent variables that operate based on an estimated multiple regression equation;
   wherein the mathematical model is updated using a plurality of input user attributes, input project attributes, input location attributes, and output indicators of relevance and the mathematical model module is utilized to:
      dynamically perform a plurality of functions associated with predicting a future value for each attribute, including the value of a renewable energy credit, based on qualitative data and quantitative data associated with the participation request data structure and the data value; and
      provide the plurality of apportionment values to at least one requesting account database based on each identifier of the plurality of identifiers;
   wherein the mathematical model is assessed using new data points compared to the prediction of future values for each attribute, including a renewable energy credit and an error analysis is used to update the mathematical model to reduce errors and bias; and
   manage a portion of the electrical grid by using further processor-executable instructions configured to:
      accept a request from and payment from a requester under an off-taker agreement such as a Power Purchase Agreement (PPA) for aggregated electrical energy from at least two of the plurality of production sites at a price based on its predicted future value;
      aggregate energy from the at least two of the plurality of production sites by causing them to connect to and deliver their electrical energy to a grid assigned to them; and
      allow the requester to withdraw electrical energy from a grid assigned to it in compliance with the off-taker agreement;
   whereby the allocation of energy from the at least-two aggregated production sites to a requester is based on the participation request, and the predicted future value of a renewable energy credit under the off-taker agreement.

2. The apparatus of claim 1, wherein the second data structure further comprising: energy credit types including solar credits, wind credits, nuclear credits, wave energy credits, carbon credits.

3. The apparatus of claim 1, wherein the plurality of parameters associated with the predetermined location of the energy equity participation request data structure comprise: a community identifier, a geographical region, an energy type, an energy source identifier, an energy output, an energy consumption, annual energy credit production, energy credit account identifier, a community population, a community population growth rate, a gross income for the community population.

4. The apparatus of claim 1, wherein the plurality of identifiers comprise a climate steward identifier, a geographical region, an energy type, an energy source identifier, an energy output, an energy consumption, annual energy credit production, energy credit account identifier, a community population, a community population growth rate, a gross income for the community population.

5. The apparatus of claim 1, wherein the at least one account comprises a community energy credit account identifier account.

6. The energy allocation apparatus of claim 1, wherein the allocation of energy is by means of at least one power grid on the basis of the renewable energy credits.

7. The energy allocation apparatus of claim 1, further including a plurality of production sites whose first data structures have been aggregated in memory, and wherein the energy from the plurality of production sites is allocated to a requester.

8. A processor-readable, non-transient medium, comprising processor-executable instructions configured to:

store in at least one memory a component collection, wherein the memory has a hierarchy of programmable interconnects that allow logic blocks to be interconnected as needed;

obtain, via at least one processor, a participation request data structure for a predetermined location based on a plurality of parameters;

obtain a first data structure based on a plurality of identifiers from at least two of a plurality of production sites that generate renewable electrical energy;

obtain a second data structure from the at least two energy production sites,
wherein the second data structure comprises a data value, including a renewable energy credit; and obtain a transfer of the data value based on at least one identifier of the plurality of identifiers and the participation request data;

provide a mathematical model configured to calculate a plurality of apportionment values for each identifier of the plurality of identifiers, where the mathematical model is a multiple regression model with independent variables that operates based on an estimated multiple regression equation;

wherein the mathematical model is updated using a plurality of input user attributes, input project attributes, input location attributes, and output indicators of relevance; and the mathematical model dynamically performs a plurality of functions associated with predicting a future value for each attribute based on qualitative data and quantitative data associated with the participation request data structure and the data value;

provide the plurality of apportionment values to at least one requesting database based on each identifier of the plurality of identifiers; and wherein the mathematical model is assessed using new data points compared to the prediction of future values for each attribute, including a renewable energy credit, and an error analysis is used to update the mathematical model to reduce errors and bias;

manage a portion of the electrical grid by using further processor-executable instructions configured to:

accept a request from and payment from a requester under an off-taker agreement such as a Power Purchase Agreement (PPA) for aggregated electrical energy from the at least two of the plurality of production sites at a price based on its predicted future value, aggregate energy from the at least two of the plurality of production sites by causing them to connect to and deliver their electrical energy to a grid assigned to them, and allow the requester to withdraw electrical energy from a grid assigned to it in compliance with the off-taker agreement;

whereby the allocation of energy from the at least two aggregated production sites to a requester is based on the participation request and predicted future value of a renewable energy credit under the off-taker agreement.

9. The medium of claim 8, including instructions further comprising energy credit types including solar credits, wind credits, nuclear credits, wave energy credits, carbon credits.

10. The medium of claim 8, wherein the plurality of parameters associated with the predetermined location of the energy equity participation request data structure comprise: a community identifier, a geographical region, an energy type, an energy source identifier, an energy output, an energy consumption, annual energy credit production, energy credit account identifier, a community population, a community population growth rate, a gross income for the community population.

11. The medium of claim 8, wherein the plurality of identifiers comprise a climate steward identifier, a geographical region, an energy type, an energy source identifier, an energy output, an energy consumption, annual energy credit production, energy credit account identifier, a community population, a community population growth rate, a gross income for the community population.

12. The medium of claim 8, wherein the at least one account comprises a community energy credit account identifier account.

13. The medium of claim 8, wherein the allocation of energy is by means of at least one power grid on the basis of the renewable energy credits.

14. The medium of claim 8, further including a plurality of production sites whose first data structures have been aggregated in memory, and wherein the energy from the plurality of production sites is allocated to a requester.

15. A processor-implemented system,
comprising: means to process processor-executable instructions;
a memory for storing a component collection, wherein the memory has a hierarchy of programmable interconnects that allow logic blocks to be interconnected as needed;
means to issue processor-issuable instructions from a processor-executable component collection via the means to process processor-executable instructions, the processor-issuable instructions configured to:
obtain, via at least one processor, a participation request data structure for a predetermined location based on a plurality of parameters;
obtain a first site data structure based on a plurality of identifiers from at least two of a plurality of production sites that generate renewable electrical energy;
obtain a second data structure from the at least two production site sites, wherein the second data structure comprises a data value, including a renewable energy credit;
obtain a transfer of the data value based on at least one identifier of the plurality of identifiers and the participation request data;
provide a mathematical model to calculate a plurality of apportionment values for each identifier of the plurality of identifiers, where the mathematical model is a multiple regression model with independent variables that operates based on an estimated multiple regression equation;
wherein the mathematical model is updated using a plurality of input user attributes, input project attributes, input location attributes, and output indicators of relevance;
utilize the mathematical model to,
dynamically perform a plurality of functions associated with predicting a future value for each attribute based on qualitative data and quantitative data associated with the participation request data structure and the value;
provide the plurality of apportionment values to at least one requesting database based on each identifier of the plurality of identifiers; and
wherein the mathematical model is assessed using new data points compared to the prediction of future values for each attribute, including a renewable energy credit, and an error analysis is used to update the mathematical model to reduce errors and bias;

manage a portion of the electrical grid by using further processor-executable instructions configured to:

accept a request from and payment from a requester under an off-taker agreement such as a Power Purchase Agreement (PPA) for aggregated electrical energy from the at least two of the plurality of production sites at a price based on its predicted future value, aggregate energy from the at least two of the plurality of production sites by causing them to connect to and deliver their electrical energy to a grid assigned to them, and allow the requester to withdraw electrical energy from a grid assigned to it in accordance with the off-taker agreement;

whereby the allocation of energy from the at least two aggregated production sites to a requester is based on the participation request and predicted future value of a renewable energy credit.

16. The system of claim 15, including instructions further comprising: energy credit types including solar credits, wind credits, nuclear credits, wave energy credits, carbon credits.

17. The system of claim 15, wherein the plurality of parameters associated with the predetermined location of the energy equity participation request data structure comprise: a community identifier, a geographical region, an energy type, an energy source identifier, an energy output, an energy consumption, annual energy credit production, energy credit account identifier, a community population, a community population growth rate, a gross income for the community population.

18. The system of claim 15, wherein the plurality of identifiers comprise a climate steward identifier, a geographical region, an energy type, an energy source identifier, an energy output, an energy consumption, annual energy credit production, energy credit account identifier, a community population, a community population growth rate, a gross income for the community population.

19. The system of claim 15, wherein the at least one account comprises a community energy credit account identifier account.

20. The system of claim 15, wherein the allocation of energy is by means of at least one power grid on the basis of the renewable energy credits.

21. The system of claim 15, further including a plurality of production sites whose first data structures have been aggregated in memory, and wherein the energy from the plurality of production sites is allocated to a requester.

22. A processor-implemented process for renewable energy allocation, comprising executing processor-executable instructions to:

store in at least one memory a component collection, wherein the memory has a hierarchy of programmable interconnects that allow logic blocks to be interconnected as needed;

obtain, via at least one processor, a participation request data structure for a predetermined location based on a plurality of parameters from at least two of a plurality of production sites that generate renewable electrical energy;

obtain a second data structure from the at least two of the plurality of energy production sites, wherein the second data structure comprises a data value, including a renewable energy credit; and obtain a transfer of the data value based on at least one identifier of the plurality of identifiers and the participation request data;

provide a mathematical model to calculate a plurality of apportionment values for each identifier of the plurality of identifiers, where the mathematical model is a multiple regression model with independent variables that operates based on an estimated multiple regression equation;

wherein the mathematical model is updated using a plurality of input user attributes, input project attributes, input location attributes, output indicators of relevance;

utilize the mathematical model to dynamically perform a plurality of functions associated with predicting a future value for each attribute, including the value of a renewable energy credit, based on qualitative data and quantitative data associated with the participation request data structure and the data value;

provide the plurality of apportionment values to at least one requesting database based on each identifier of the plurality of identifiers; and wherein the mathematical model is assessed using new data points compared to the prediction of future values for each attribute, including a renewable energy credit, and an error analysis is used to update the mathematical model to reduce errors and bias;

manage a portion of the electrical grid by using further processor-executable instructions configured to:

accept a request from and payment from a requester under an off-taker agreement, such as a Power Purchase Agreement (PPA), for aggregated electrical energy from the at least two of the plurality of production sites at a price based on its predicted future value, aggregate energy from the at least two of the plurality of production sites by causing them to connect to and deliver their electrical energy to a grid assigned to them, and allow the requester to withdraw electrical energy from a grid assigned to it in compliance with the off-taker agreement;

whereby the allocation of energy from the at least two aggregated production sites to a requester is based on the participation request and predicted future value of a renewable energy credit under the off-taker agreement.

23. The process of claim 22, including instructions further comprising energy credit types including solar credits, wind credits, nuclear credits, wave energy credits, carbon credits.

24. The process of claim 22, wherein the plurality of parameters associated with the predetermined location of the energy equity participation request data structure comprise: a community identifier, a geographical region, an energy type, an energy source identifier, an energy output, an energy consumption, annual energy credit production, energy credit account identifier, a community population, a community population growth rate, a gross income for the community population.

25. The process of claim 22, wherein the plurality of identifiers comprise a climate steward identifier, a geographical region, an energy type, an energy source identifier, an energy output, an energy consumption, annual energy credit production, energy credit account identifier, a community population, a community population growth rate, a gross income for the community population.

26. The process of claim 22, wherein the at least one account comprises a community energy credit account identifier account.

27. The process of claim 22, wherein the allocation of energy is by means of at least one power grid on the basis of the renewable energy credits.

28. The process of claim 22, further including a plurality of production sites whose first data structures have been aggregated in memory, and wherein the energy from the plurality of production sites is allocated to a requester.

29. An energy allocation apparatus, comprising:
at least one memory with a component collection stored in the at least one memory; at least one processor disposed in communication with the at least one memory and
configured to issue a plurality of processor-executable instructions from the component collection, the processor-executable instructions configured to:
obtain, via the at least one processor, a participation request data structure for a predetermined location based on a plurality of parameters;
obtain a first data structure based on a plurality of identifiers from at least two of a plurality of production sites that generate renewable electrical;
obtain a second data structure from the least two of the plurality of production sites, wherein the second data structure comprises a data value, including a renewable energy credit; and
obtain a transfer of the data value based on at least one identifier of the plurality of identifiers and the participation request data;
utilize a mathematical model configured to calculate a plurality of apportionment values for each identifier of the plurality of identifiers;
wherein the mathematical model is updated using a plurality of input user attributes, input project attributes, input location attributes, and output indicators of relevance and is utilized to:
dynamically perform a plurality of functions associated with predicting a future value for each attribute, including the value of a renewable energy credit, based on qualitative data and quantitative data associated with the participation request data structure and the data value; and
provide the plurality of apportionment values to at least one requesting account database based on each identifier of the plurality of identifiers; and
manage a portion of the electrical grid by using further processor-executable instructions configured to:
accept a request from and payment from a requester under an off taker agreement, such as a Power Purchase Agreement (PPA), for aggregated electrical energy from at least two of the plurality of production sites at a price based on its predicted future value,
aggregate energy from the at least two of the plurality of production sites by causing them to connect to and deliver their electrical energy to a grid assigned to them, and
allow the requester to withdraw electrical energy from a grid assigned to it in compliance with the PPA;
whereby the allocation of energy from the at least two aggregated production sites to a requester is based on the participation request and the predicted future value of a renewable energy credit under the PPA.

* * * * *